US006807191B2

(12) United States Patent
Fujii et al.

(10) Patent No.: US 6,807,191 B2
(45) Date of Patent: *Oct. 19, 2004

(54) DECODER FOR COMPRESSED AND MULTIPLEXED VIDEO AND AUDIO DATA

(75) Inventors: Yukio Fujii, Yokohama (JP); Masuo Oku, Kamakura (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 8 days.

(21) Appl. No.: 09/392,565

(22) Filed: Sep. 9, 1999

(65) Prior Publication Data

US 2002/0067744 A1 Jun. 6, 2002

Related U.S. Application Data

(63) Continuation of application No. 09/161,724, filed on Sep. 29, 1998, now Pat. No. 5,966,385, which is a continuation of application No. 08/622,622, filed on Mar. 27, 1996, now Pat. No. 5,898,695.

(30) Foreign Application Priority Data

Mar. 29, 1995 (JP) .............................................. 7-071131
Mar. 29, 1995 (JP) .............................................. 7-071132

(51) Int. Cl.[7] .............................................. H04N 7/12
(52) U.S. Cl. ...................................... 370/464; 370/486
(58) Field of Search ................................. 370/465, 477, 370/516, 389, 474, 503, 428, 457, 509, 536, 537, 464, 522, 506, 517, 486; 348/10, 423, 467, 385, 382, 714

(56) References Cited

U.S. PATENT DOCUMENTS

| 5,420,866 A | * | 5/1995 | Wasileski |
| 5,521,918 A | * | 5/1996 | Kim |
| 5,559,999 A | * | 9/1996 | Maturi et al. ................ 395/550 |
| 5,649,029 A | * | 7/1997 | Galbi .......................... 382/233 |
| 5,668,601 A | * | 9/1997 | Okada et al. ................ 348/423 |
| 5,671,319 A | * | 9/1997 | Ueda ............................ 386/96 |
| 5,867,176 A | * | 2/1999 | Yamagishi ................... 345/473 |
| 5,978,855 A | * | 11/1999 | Metz ........................... 709/249 |
| 6,016,382 A | * | 1/2000 | Yamagishi et al. .......... 388/109 |

FOREIGN PATENT DOCUMENTS

| JP | 7059051 | 3/1995 | .......... H04N/5/937 |
| JP | 7073333 | 3/1995 | ............. G06T/9/00 |
| JP | 7075081 | 3/1995 | ............ H04N/7/16 |

* cited by examiner

Primary Examiner—Kenneth Vanderpuye
(74) Attorney, Agent, or Firm—Antonelli, Terry, Stout & Kraus, LLP

(57) ABSTRACT

An apparatus for filtering TS packets multiplexed with a plurality of programs and sending the filtered packets to decoders. A packet landing buffer is provided in a RAM used for a microprocessor for system control. After a channel is selected, the microprocessor filters video and audio data and performs a value added service process.

2 Claims, 23 Drawing Sheets

DECODER FOR COMPRESSED AND MULTIPLEXED VIDEO AND AUDIO DATA

This application is a continuation of U.S. patent application Ser. No. 09/161,724 filed on Sep. 29, 1998 (now U.S. Pat. No. 5,966,385), which in turn is a continuation of U.S. patent application Ser. No. 08/622,622 filed on Mar. 27, 1996 (now U.S. Pat. No. 5,898,695).

BACKGROUND OF THE INVENTION

The present invention relates to decoding video and audio data which are multiplexed after compression coding, and more particularly to a receiver/decoder for receiving video and audio data compression encoded by high efficiency coding means and decoding the received encoded data.

In order to reduce a transmission/record cost of a large amount of video data, the video data is compression encoded by high efficiency coding means which removes redundancy and thereafter the data is transmitted or recorded. An example of high efficiency coding means is the well known MPEG method standardized by ISO/SC29/WG11. In the MPEG method, an encoded data multiplexing method as well as the video and audio data encoding method are standardized as MPEG/Systems.

In the fields of broadcasting and communications, in recent years, redundancy of moving picture video data is removed to compress the video data which is then transmitted in the form of digital signals. For video data compression, discrete cosine transformation (DCT) and motion compensation prediction coding such as one stipulated in MPEG specifications are generally performed. With high compression ratio of video data, a plurality of broadcast programs can be transmitted in a multiplex manner over a single transmission channel. A program means a set of video data and its associated audio and/or text data.

Multiplexing of a plurality of programs according to the MPEG specifications is stipulated in ITU-T Rec. H.222.0, ISO/IEC13818-1, 1994 (E), "Information Technology—Generic Coding of Moving Pictures and Associated Audio—Part 1: Systems", pp. 9–21, wherein it is described that a transport stream (hereinafter abbreviated as TS) packet is used for such multiplexing which has a fixed length of 188 bytes. The structure of an apparatus called a set top box is shown in the block diagram of FIG. 2. This apparatus separates TS packets formed in accordance with the MPEG specifications and supplied from a broadcast station or the like, and supplies them to a video decoder and an audio decoder to output decoded video and audio signals. Conventional techniques will be described with reference to FIG. 2.

A tuner 1 selects data of one channel transmitted from a communications medium such as a CATV and a communications satellite, and supplies the selected channel data to a demodulator 2. The demodulator 2 demodulates the channel data which was channel encoded by QAM, QPSK, or the like, performs an error correction process by using redundancy codes, and supplies the processed data to a demultiplexer 3. The processed data is a bit stream data of the TS packet format which is shown in FIGS. 3A and 3B. The formats are classified into two types shown in FIGS. 3A and 3B according to the contents of a TS packet. The format shown in FIG. 3A is used for transmitting program elements, including video data, audio data, text data such as teletext, and other data. Each TS packet of 188 bytes is constituted by a transport stream header (abbreviated as TS header) and a payload containing elements described above. The TS header always contains a packet ID (abbreviated as PID) representative of the attribute of the TS packet, and sometimes contains a program clock reference (abbreviated as PCR) which is time information used for a decoder to recover a system clock used as a time reference when each element was encoded. The payload is part of a packetized elementary stream (PES). The PES packet is a variable length packet constituting an element unit determined by each element, the type of data storage media, and the like. The PES packet is constituted by data of each element and a PES header. The PES header includes a stream ID for describing the element contents, time stamp information (PTS) for describing a PES packet length and a time when the element is displayed, and other pieces of information. The element unit designated by PTS is called an access unit. For example, one picture is the unit for video data, and one frame is the unit for audio data. The format shown in FIG. 3B is used for program specific information (abbreviated as PSI) which is additional information used for the system control. The payload of the TS packet is part of PSI described in units of sections. Each section is constituted by a section header, PSI, and cyclic redundancy check (CRC) used for error correction. The section header indicates the attribute of the succeeding PSI and a section length. PSI is structured hierarchically and contains information necessary for the system control, such as program association table (PAT) describing program information (specifically, PID of PMT to be described later) contained in bit stream data transmitted as TS, and a program map table (PMT) describing a correspondence between the element and PID in each program. The demultiplexer 3 shown in FIG. 2 receives a TS packet, and supplies PSI data via a data bus to a system decode buffer allocated in a RAM 7, and video and audio data which are elements constituting a program selected by a user, respectively to a video decoder 8 and an audio decoder 10. The demultiplexer 3 samples time information from the header of the TS packet containing PCR, and supplies control signals to a clock generator 4 to recover the system clock. A microprocessor 12 decodes the contents of PSI data sent to the system decode buffer in RAM 7 and stores the results in a system decode buffer 73 in RAM 7 in the data format usable by system control software programs. Software programs are generally stored in the same RAM or in a dedicated ROM. The work area of software programs is generally developed in RAM 72. In response to an instruction entered by a user via a user interface unit 13, the microprocessor 12 supplies PID which is used for deriving the TS packet of a program, to the demultiplexer 3, by using the decoded PSI data, and also supplies a control signal which is used for selecting the program, to the tuner 1. The video decoder 8 and audio decoder 10 decode the video and audio data in cooperation with a video decode buffer 9 and an audio decode buffer 11. Data transmission speed on a transport channel is different from the bit rate used when each element was encoded, because of multiplexing of programs. Therefore, if data is supplied at the data transmission speed directly to the video decoder 8 and audio decoder 10, the video decode buffer 9 and audio decode buffer 11 may locally overflow or underflow and video and audio outputs are disturbed. It is therefore necessary to insert packet transport buffers 5 and 6 between the demultiplexer and decoders to convert the bit rates in accordance with the capacities of the decoder buffers, and thereafter to supply element data to the video decoder 8 and audio decoder 10. Multiplexing according to the MPEG specifications assume that a packet transport buffer having a capacity of 512 bytes per each element is provided.

The present inventors have found out problems of an increased number of system components and an increased cost to be caused by the provision of the packet transport buffers 5 and 6 independently from the system memory. Even if the packet transport buffers are implemented in the demultiplexer 3, the increased circuit scale and an increased cost thereof are inevitable.

The MPEG specifications standardize not only a video and audio encoding method but also a coded data multiplexing method, as the MPEG/Systems.

FIG. 24 shows the structure of a transport packet (hereinafter called a TS packet) adopted by the transport system which represents one multiplexing method of the MPEG/Systems.

Each TS packet is a fixed length packet of 188 bytes including a 4-byte header and a 184-byte payload. The 4-byte header is constituted by a sync byte, an error flag, a unit start flag, a scramble control flag, a priority flag, a set of PID data, an adaptation field control flag, and a cyclic counter. The contents of PID data identify the payload of the TS packet.

The payload is constituted by an adaptation field (hereinafter abbreviated as AF) designated by the adaptation field control flag and a payload having video and audio encoded data and multiplexing information data. AF is constituted by AF length data, a discontinuity flag, a random access flag, a priority flag, a PCR flag indicating a presence/absence of AF optional data, an OPCR flag, a splice point flag, a private data flag, and optional data designated by these flags. Of the optional data, PCR data is used for clock synchronization between the transmission and reception sides, and the reception side generates a reference clock of 27 MHz by using a phase locked loop.

FIG. 25 illustrates selection of a particular channel of encoded video and audio data from a bit stream (TS packets) with a plurality of programs (hereinafter called channels) multiplexed. A program association table (hereinafter abbreviated as PAT) is always transmitted by a TS packet having PID="0". PAT contains multiplexing information of a plurality of channels and supplies information on whether each channel program map table (hereinafter abbreviated as PMT) is transmitted by a TS packet having what PID value.

FIG. 25 shows an example of multiplexing of three channels. In order to select a j-th channel and obtain its PMT, the TS packet with PID=Mj is captured. This PMT has information that the video data is transmitted by the TS packet with PID=Aj and the audio data is transmitted by the TS packet with PID=Vj. Therefore, encoded video data can be received, by capturing the TS packet with PID=Vj and encoded audio data can be received by capturing the TS packet with PID=Aj.

The MPEG/Systems described above, however, define only syntax of TS packets and the like and does not determine how a reception apparatus is actually configured. In addition, it does not provide particular definition of multiplexing of value added services such as program guidance, which definition is relied upon arbitrary decision on the side of broadcasting companies or program vendors.

In conventional technique disclosed in JP-A-4-229464 (corresponding to EP-0460751A2), each packet has time information which is used on the decode side as a reference of various timings including a decode timing.

SUMMARY OF THE INVENTION

It is an object of the present invention to provide a decoder for compressed and multiplexed video and audio data, wherein packet landing buffers are allocated in a RAM used by a CPU for the system control to thereby reduce the number of components and lower the cost of components.

According to one aspect of the present invention, there is provided a decoder for compressed and multiplexed video and audio data for receiving a group of packets having a plurality of multiplexed packet sets each containing video data and associated audio data compressed by compression codes and packetized and outputting a set of video and audio signals, comprising: a video decoder for decoding the compressed video data; an audio decoder for decoding the compressed audio data; a first memory for sequentially storing the group of packets; a processor for executing a process in accordance with a stored program, the process including sequentially reading a packet from the first memory, filtering packets containing a set of particular video and audio data and a control packet containing attribute information of the group of packets, and supplying the particular video and audio data to the video and audio decoders; a second memory having a work area for at least the stored program; a third memory for storing the attribute information contained in the control packet; and an interface unit for transferring an external control signal to the processor, the external control signal being used for filtering a set of video and audio data, wherein the first to third memories are provided in the same memory element.

A storage device of RAM used by a processor (CPU) as a main memory stores operating system software and is required to have a capacity of several mega bits. It is therefore easy to allocate the memory of which capacity is required 512 bytes for a packet landing buffer for each data element in the RAM. Therefore, the number of components is not increased.

It is another object of the present invention to provide a receiver for compressed video and audio data capable of receiving a bit stream with a plurality of multiplexed channels, decoding the video and audio data, and also receiving value added service data flexibly.

According to another aspect of the invention achieving the above object, there is provided an apparatus comprising: data selecting means for selecting an encoded stream of one channel (a group of packets), multiplexing information data, and additional information data, from a multiplexed stream (packets); bus access means for supplying the selected encoded stream and the like to a bus; a microprocessor connected to the bus; a random access memory; a program memory; means for processing the additional information data; means for decoding the video data; and means for decoding the audio data.

The apparatus may further comprises: means for generating a clock signal in accordance with clock information in the encoded stream; packet sync supply means for supplying a packet sync signal of the encoded stream to the microprocessor; means for adding an error flag indicative of failure in correcting transmission errors to the encoded stream, and data storage media interface means.

The encoded stream of one channel and other data selected by the data selecting means are stored via the bus access means and the bus into the random access memory, data read from the random access memory is analyzed and discriminated, and via the bus the video data is supplied to the video data decoding means, the audio data is supplied to the audio data decoding means, the additional information data or processed additional information data is supplied to the additional information data processing means.

The video data decoding means expands and decodes the encoded video data and the audio data decoding means expands and decodes the encoded audio data to reproduce video and audio signals. The additional information data processing means allows, for example, a program guide, to be displayed on video data in an overlay manner.

The clock signal generating means supplies a clock signal to the video data decoding means, audio data decoding means, and microprocessor, to thereby facilitate transfer of data such as encoded data. The packet sync supply means facilitates recognition of packet sync by the microprocessor.

The error flag adding means allows the video data decoding means or the like to recognize a presence of any error without using a specific signal line. The data storage media

DESCRIPTION OF THE PREFERRED EMBODIMENTS

Embodiments of the invention will be described with reference to the accompanying drawings.

Figure 1:
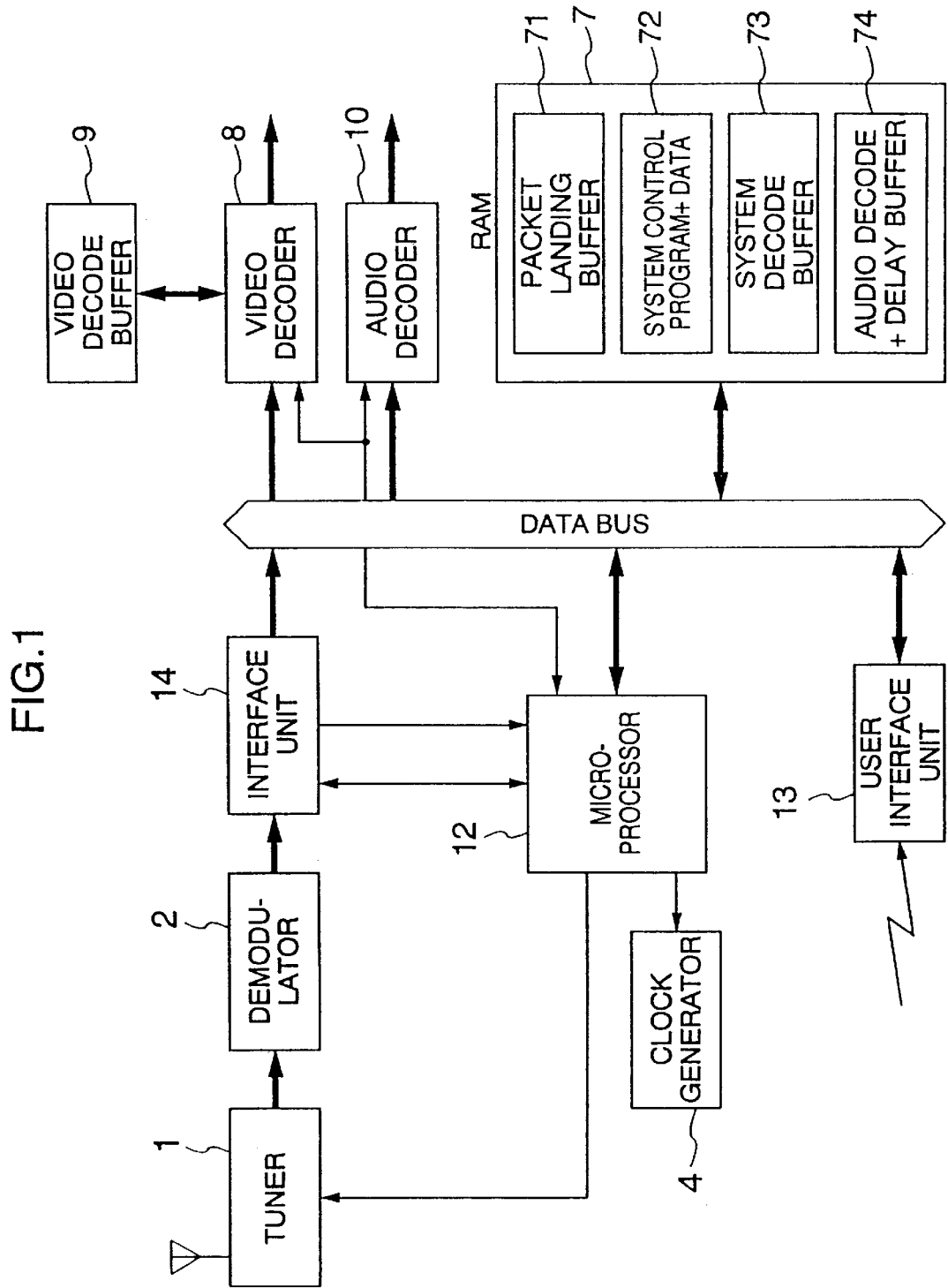
FIG. 1 is a block diagram showing a first embodiment of the invention.
Figure 2:
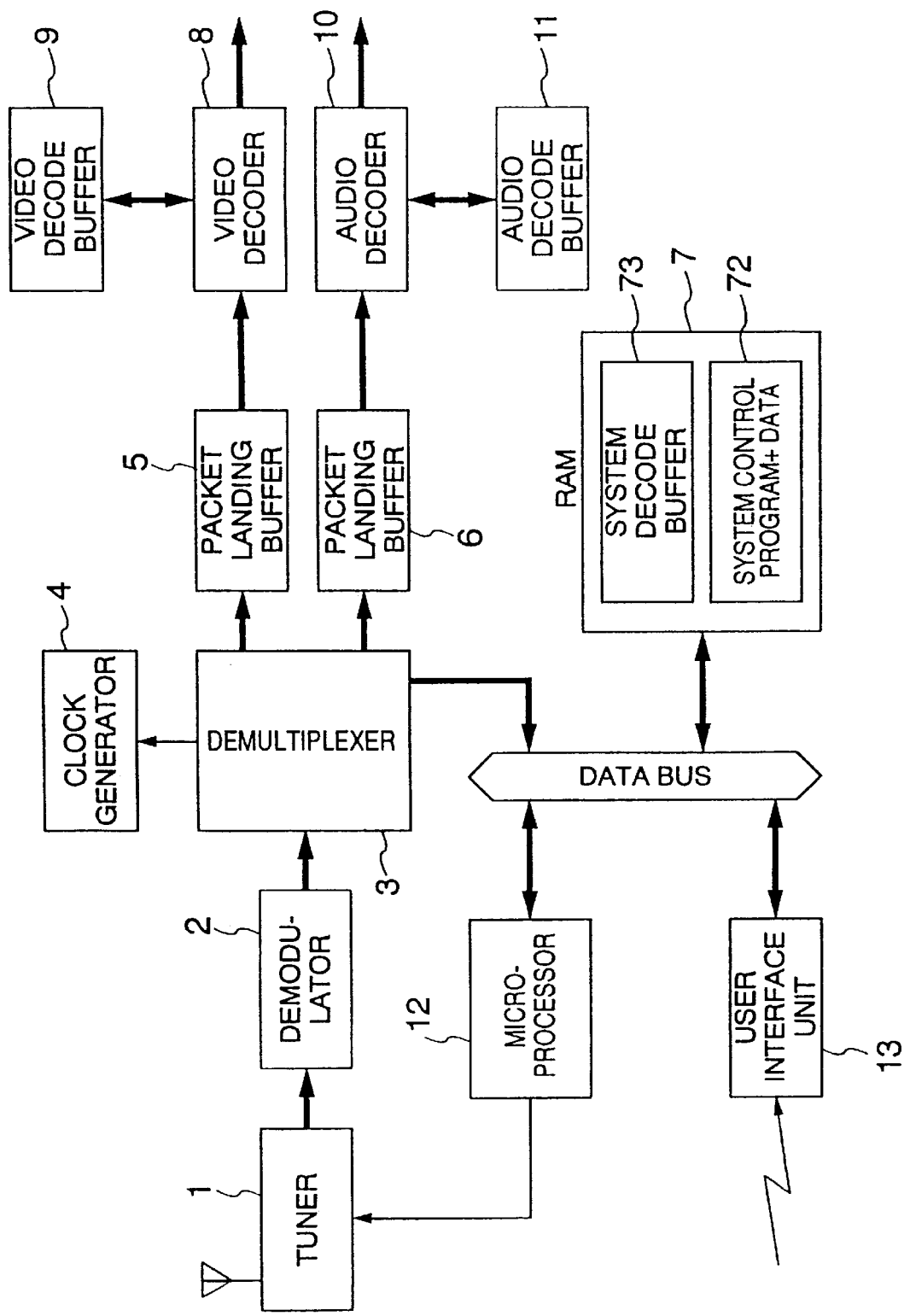
FIG. 2 is a block diagram showing an example of a conventional apparatus.
Figure 3A:
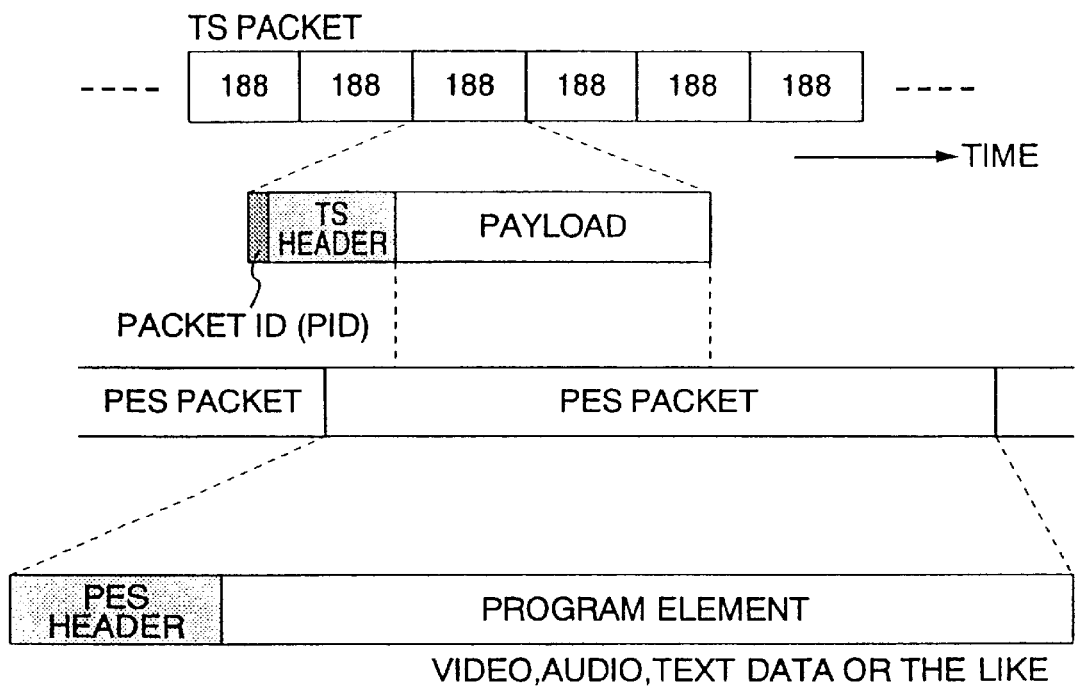
FIGS. 3A and 3B are diagrams showing the structure of a transport stream packet.
Figure 3B:
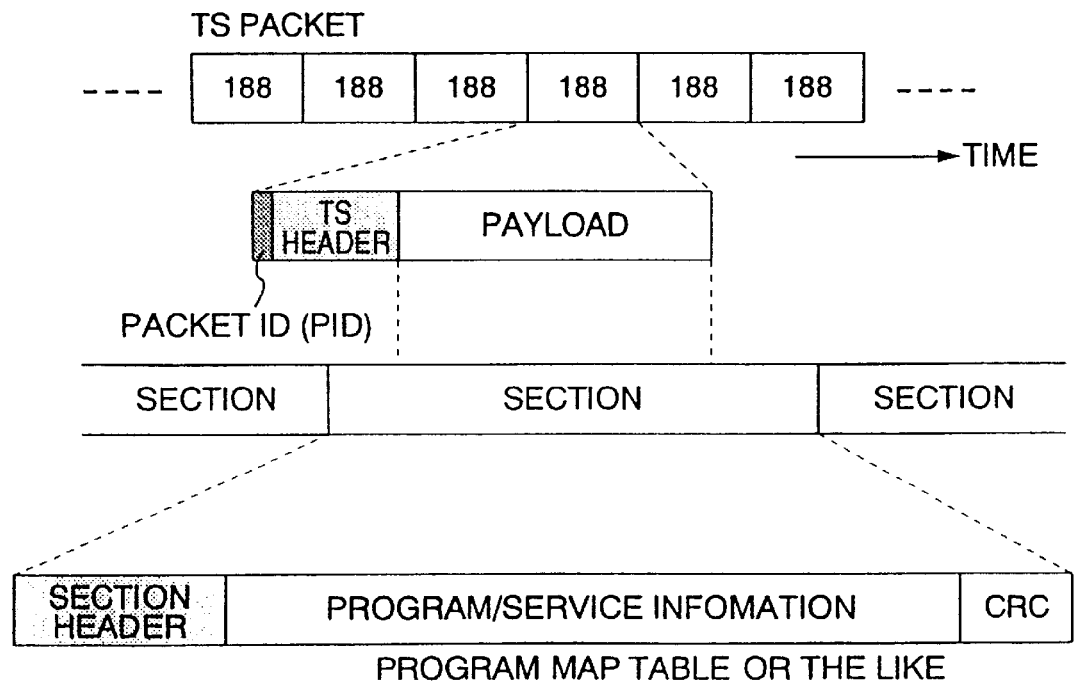
Figure 4:
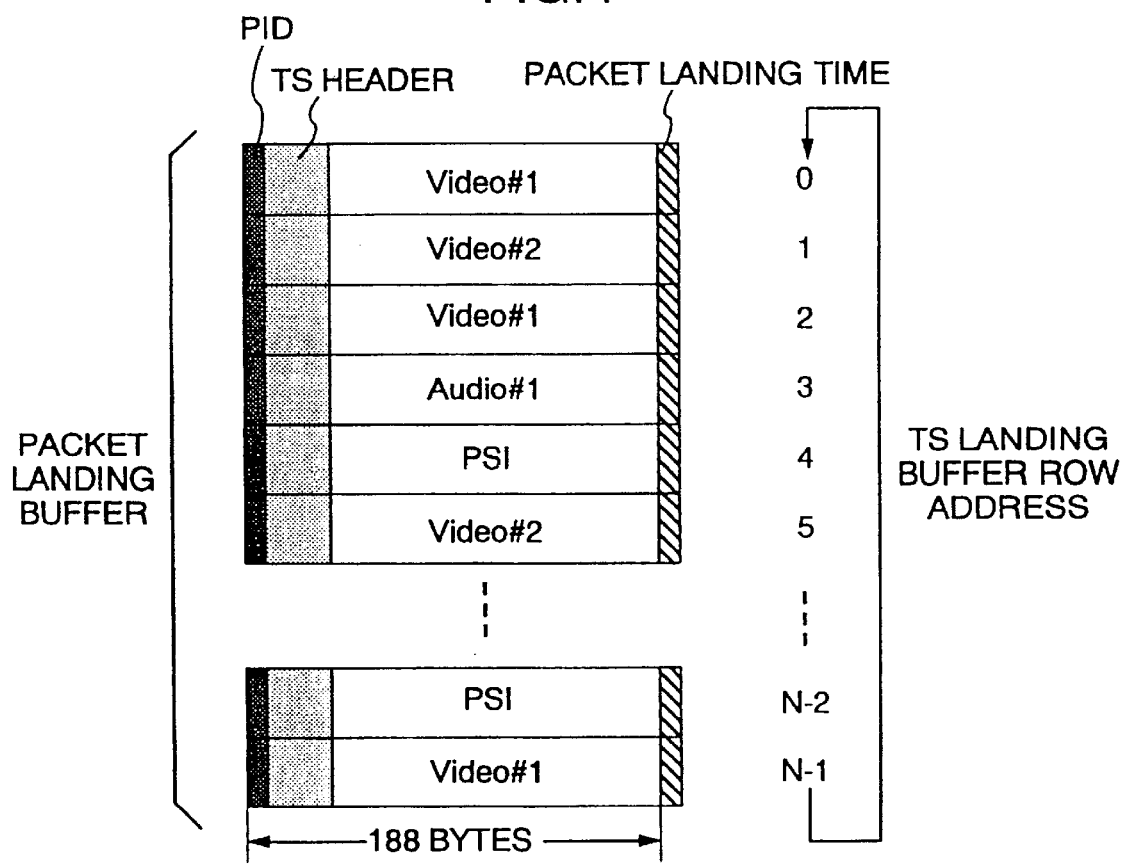
FIG. 4 is a diagram illustrating the structure of a packet landing buffer.

FIG. 1 is a block diagram showing the structure of the first embodiment of the invention. A tuner 1 selects data of one channel transmitted from a communications medium such as a CATV and a communications satellite, and supplies the selected channel data to a demodulator 2. The demodulator 2 demodulates the channel data which was channel encoded by QAM, QPSK, or the like, performs an error correction process by using redundancy codes, and supplies the processed data to an interface unit 14. The processed data is a bit stream data of the TS packet format. In response to a control signal from a microprocessor 12, the interface unit 14 transfers all TS packet data to a packet landing buffer 71 in a main memory RAM 7. The internal structure of the packet landing buffer 71 is shown in FIG. 4. The packet landing buffer 71 is a first-in-first-out (FIFO). Only one packet is written in each line in the landing order, and read in the same order. Video #1 in FIG. 4 represents a packet containing video data of a program #1. The buffer is assigned with row addresses which are updated by one each time a packet is written, and after N packets are received, the address returns to 0. The line number N is set so as to satisfy:

188 bytes×$N$>512 bytes×(maximum element number per program+ 1)*(maximum program number per TS)

Figure 5:
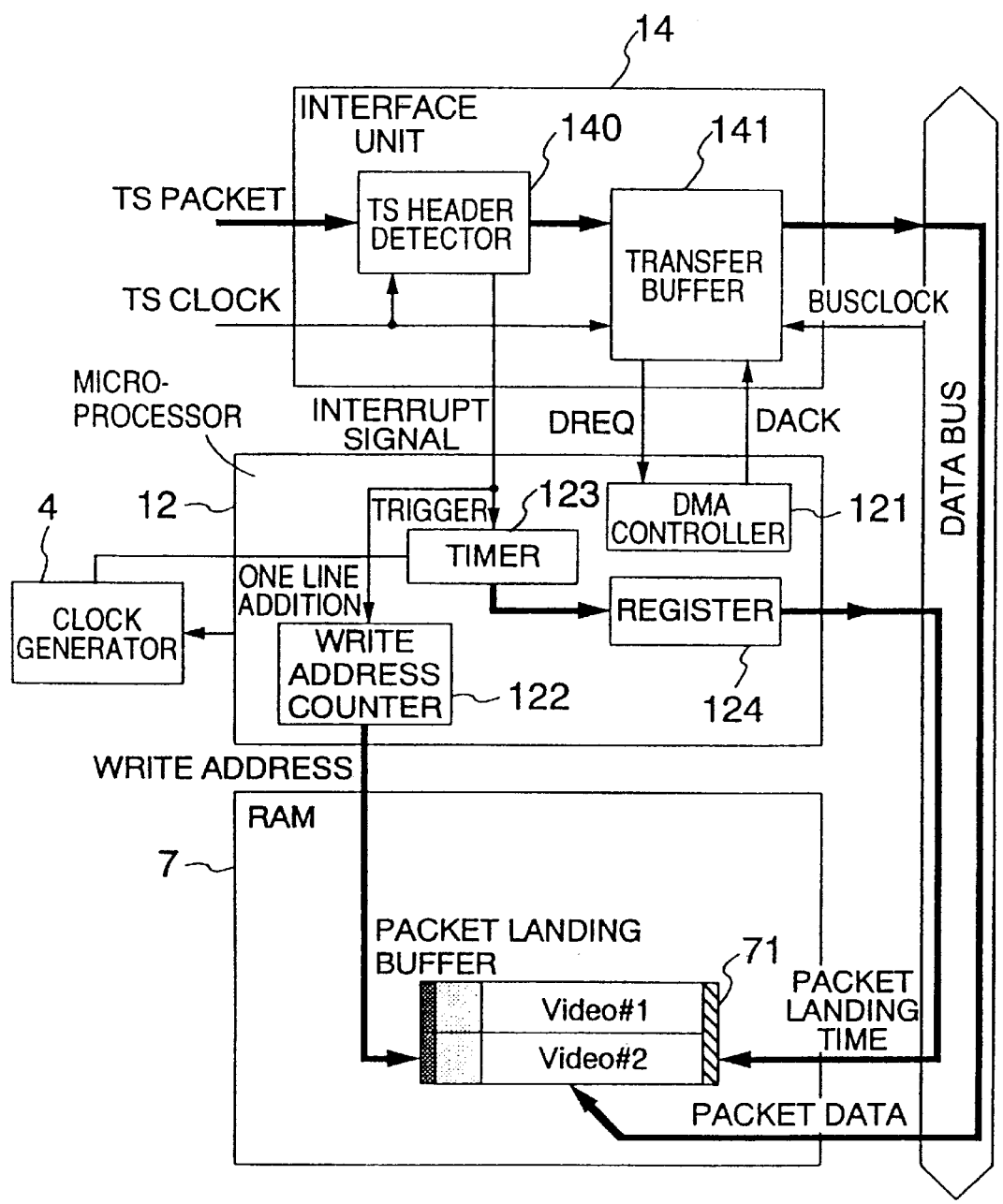
FIG. 5 is a diagram illustrating signal transfer among an interface unit, a microprocessor, and a RAM.

Each line of the packet landing buffer 71 is added with an information byte representative of a packet landing time to allow the recovery of the system clock. A write method to the packet landing buffer 71 will be described with reference to FIG. 5. FIG. 5 is a block diagram showing the details of the interface unit 14, microprocessor 12, clock generator 4, and RAM 7 shown in FIG. 1. The interface unit 14 includes a TS header detector 140 and a transfer buffer 141. By using the TS packet data and a TS packet transfer clock tsClock, the TS header detector 140 searches the TS packet header based upon a bit pattern, and supplies a TS packet header byte landing timing to the microprocessor 12 in the form of an interrupt signal. By using the interrupt signal as a trigger signal, the microprocessor 12 transfers the contents of a timer to a register 124. The timer 123 is an up-counter which is counted up in response to the system clock frequency. The landing time measured by the timer 123 is therefore transferred to the register 124. The interrupt signal counts up by one line the value of a write address counter 122. Therefore, the row address is updated synchronously with the packet header, and even if an error that the packet length is not 188 bytes occurs, the next packet immediately after the error is ensured to be correctly written without any practical problem. The transfer buffer 141 is a buffer for outputting a TS packet onto a data bus, and transfers the data at high speed to RAM 7 through direct memory access (DMA), by performing data bit conversion and time axis conversion from transport path clock tsClock into data bus clock busClock. The write timing to RAM 7 is controlled through handshake with a DMA controller 121. Specifically, after the data transfer preparation is completed at the transfer buffer 141, a transfer request signal DREQ is outputted and when a transfer acknowledge signal DACK is sent back from the DMA controller 121, the data is written in RAM 7 without passing through the register of the microprocessor 12. The write row address used is the address counted up by the above-described mechanism. After one packet data is transferred, the microprocessor 12 adds information byte data representative of the landing time in the register 124 to the packed data in the packet landing buffer.

Figure 6:
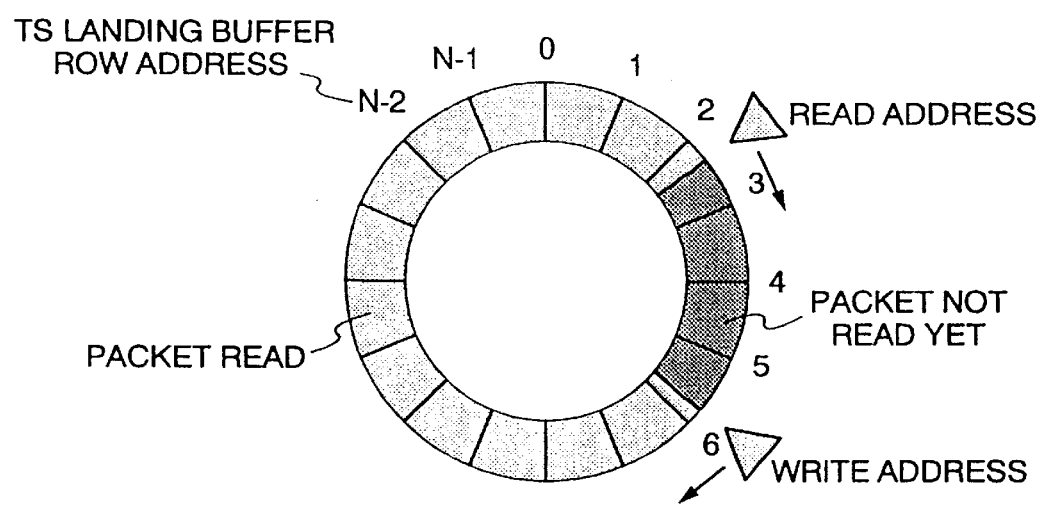
FIG. 6 is a conceptual diagram illustrating read/write timings of the packet landing buffer.
Figure 7:
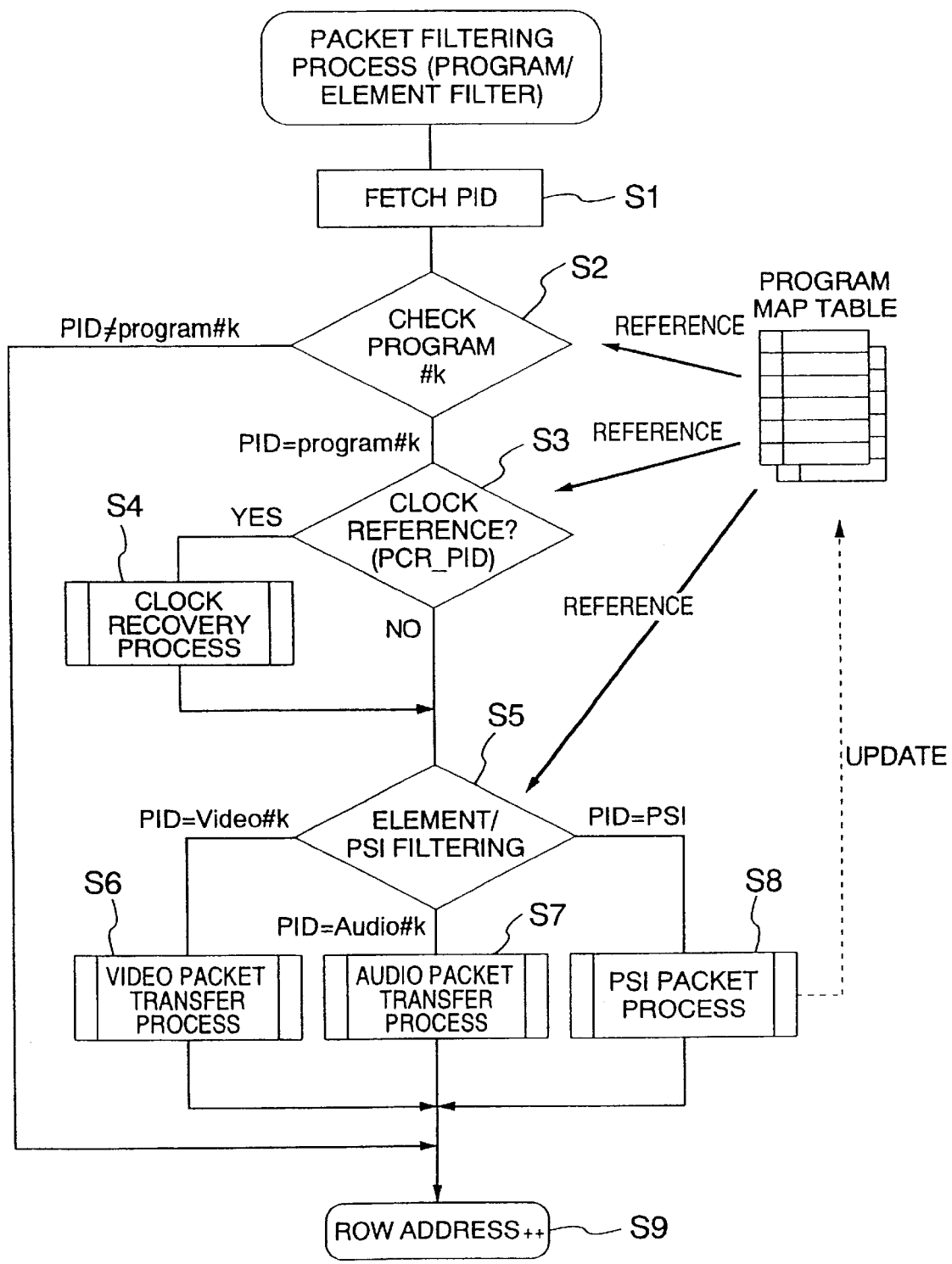
FIG. 7 is a flow chart illustrating the algorithm of a packet demultiplexing process.

The microprocessor 12 derives only elements of the user selected program from the TS packet data written in the packet landing buffer 71, and filters them to corresponding decoders. As shown in FIG. 6, the timing of reading a TS packet is set in the manner as the read address follows the write address. In order not to overflow the TS packet landing from the transport channel, the write address is updated every time the packet lands, independently from the read address. Therefore, the microprocessor 12 compares; read and write addresses and controls so that the read address will not pass the write address. In this manner, the microprocessor 12 reads the packet data and performs a packet filtering (or demultiplexing) process in accordance with the algorithm illustrated in FIG. 7. FIG. 7 illustrates a packet filtering process algorithm wherein a user selects a program number #k which contains only video and audio data as its elements. The microprocessor 12 fetches PID in the packet header (S1). It is checked by referring to the program map table (PMT) whether the fetched PID corresponds to the program #k or contains PSI (S2). If the PID does not correspond to the program #k, the flow skips to the next row address (S9). If the fetched PID corresponds to the program #k, it is checked whether the PID contains clock reference information PCR, i.e., PCR_PID (S3). If PCR is contained, the flow advances to a clock recovery process to be described layer (S4), whereas if not, the flow advances to an element/PSI discrimination process (S5). Referring to PMT, CPU checks whether PID indicates video, audio, or PSI to advance to a video packet transfer process routine (S6), an audio packet transfer process routine (S7), or a PSI packet process routine (S8), respectively. In the video packet transfer process routine (S6), the payload in the TS packet is derived and transferred. The transfer speed is controlled at each data transfer through handshake with a decoder by the Microprocessor 12 or DMA controller 121. As a result, an average transfer speed coincides with the decode speed. Alternatively, the microprocessor 12 may supply a constant rate from an internal timer, by using the bit rate information added to each element.

Figure 8:
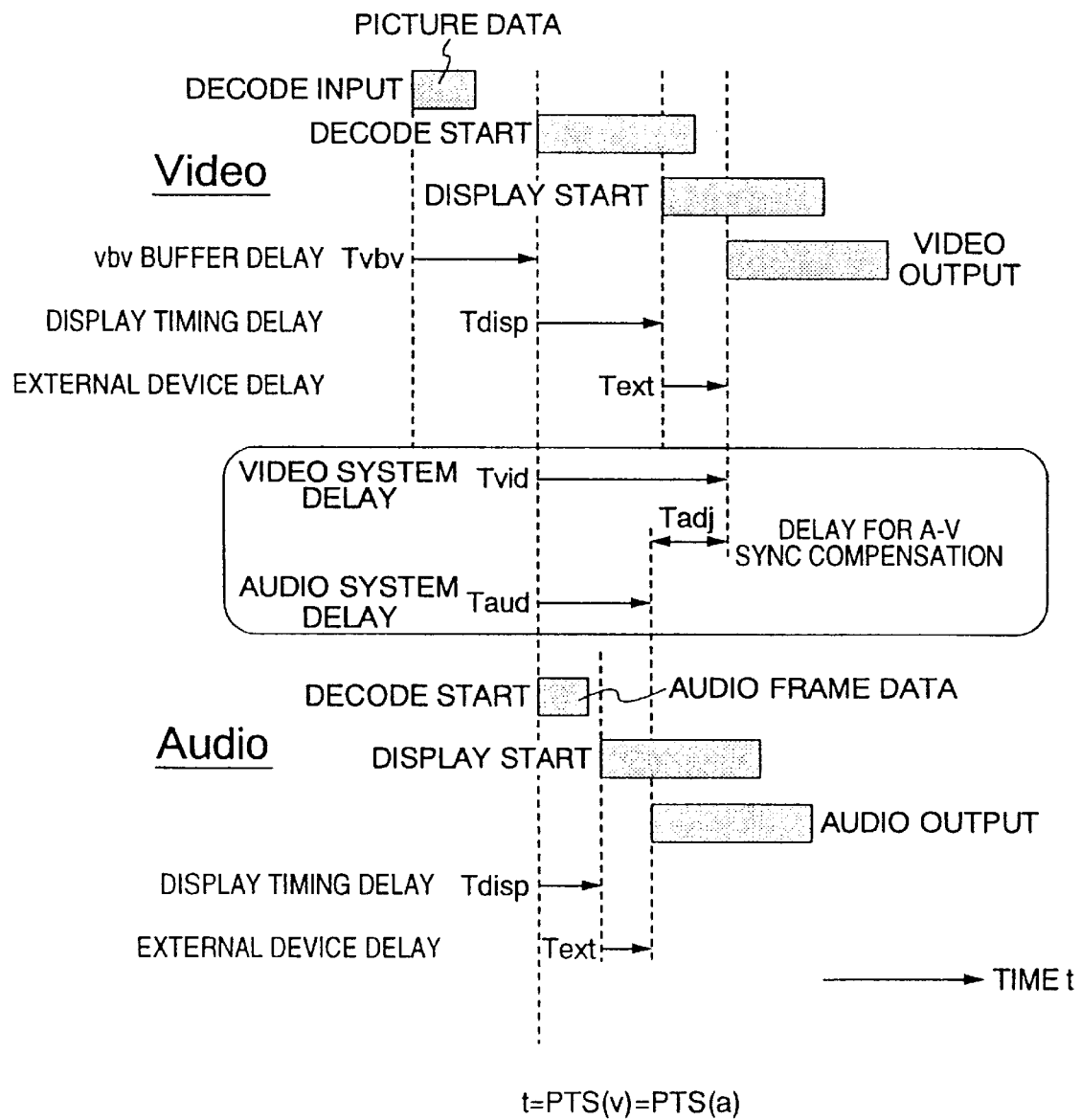
FIG. 8 is a diagram illustrating synchronous outputs of video and audio signals.

The contents of transfer data depend upon a video decoder 8. Specifically, if the decoder acknowledges an input of the PES packet, the whole PES packet including the PES packet header is transferred, or if the decoder acknowledges an input of element data, the payload of the PES packet excepting the PES header is transferred. In this case, analyzing the PES header is performed by the microprocessor 12 which manages the PTS information indicating the decode timing and supplies the video decode timing designated by PTS to the video decoder 8. Also in the audio packet transfer process routine (S7), the transfer process of the microprocessor 12 changes with the data type received by the audio decoder 10, similar to the video data type. FIG. 8 is a diagram showing the data output timings in which both the video and audio decoders 8 and 19 receive element data. For the description simplicity, it is assumed that picture data and audio frame data are requested at the same PTS, i.e., at the same timing t=PTS (v)=PTS (a). The video decode buffer 9 has a buffer stipulated by the MPEG method as video buffering verifier (vbv), and data read from this vbv buffer is decoded. The amount of read data changes with the type of picture (I, P, B), i.e., with the compression factor. I represents Intra, P represents Predicted, and B represents Bidirectional. However, if the microprocessor 12 supplies a decode timing so as to display a picture at the stipulated PTS timing, the vbv buffer has no overflow/underflow (empty). In the example shown in FIG. 8, a picture inputted to the video decoder 8 is delayed by the vbv buffer by a delay time of Tvbv. Decoding the picture starts at a timing t=PTS (v), whereas decoding an audio frame starts at a timing t=PTS (a). However, the video decoder 8 is unable to display the picture at the same time when the picture is decoded, because the decoded picture is always outputted from a display buffer. Therefore, there is a delay time Tdisp inherent to the decoder, from the decode start time to the display time. There is another delay time Text inherent to the system to be generated by digital/analog conversion of the decoded picture and display conversion matching a display device, and in an image synthesizing device. Therefore, there is generally a total delay time Tvid in the video system.

Similarly, in the audio system, there is a total delay time Taud. In order to synchronize video and audio, the microprocessor 12 is required to adjust a difference Tadj between Tvid and Taud. In this invention, a delay buffer 74 for compensating for the different Tadj is provided in RAM 7 to realize synchronized outputs. Since the delay times inherent to the decoders and system are known when the system is configured, the difference Tadj is calculated and the timing when the data is supplied to the video or audio decoder is delayed by Tadj. Specifically, data is once transferred from the packet landing buffer 71 to the delay buffer 74 and then transferred to the decoder, or the capacity of the packet landing buffer 71 is increased by an amount corresponding to Tadj and data is again read from the buffer upon lapse of the delay time. In both the cases, the delay process for synchronization can be performed in the main memory by software, without using another memory.

In the PSI packet process routire (S8), section data is analyzed, and if there is PSI data, data in a corresponding table is updated. After one TS packet is processed in accordance with its PID, the read row address of the packet landing buffer 71 is advanced by one line to process the next TS packet (S9).

Figure 9:
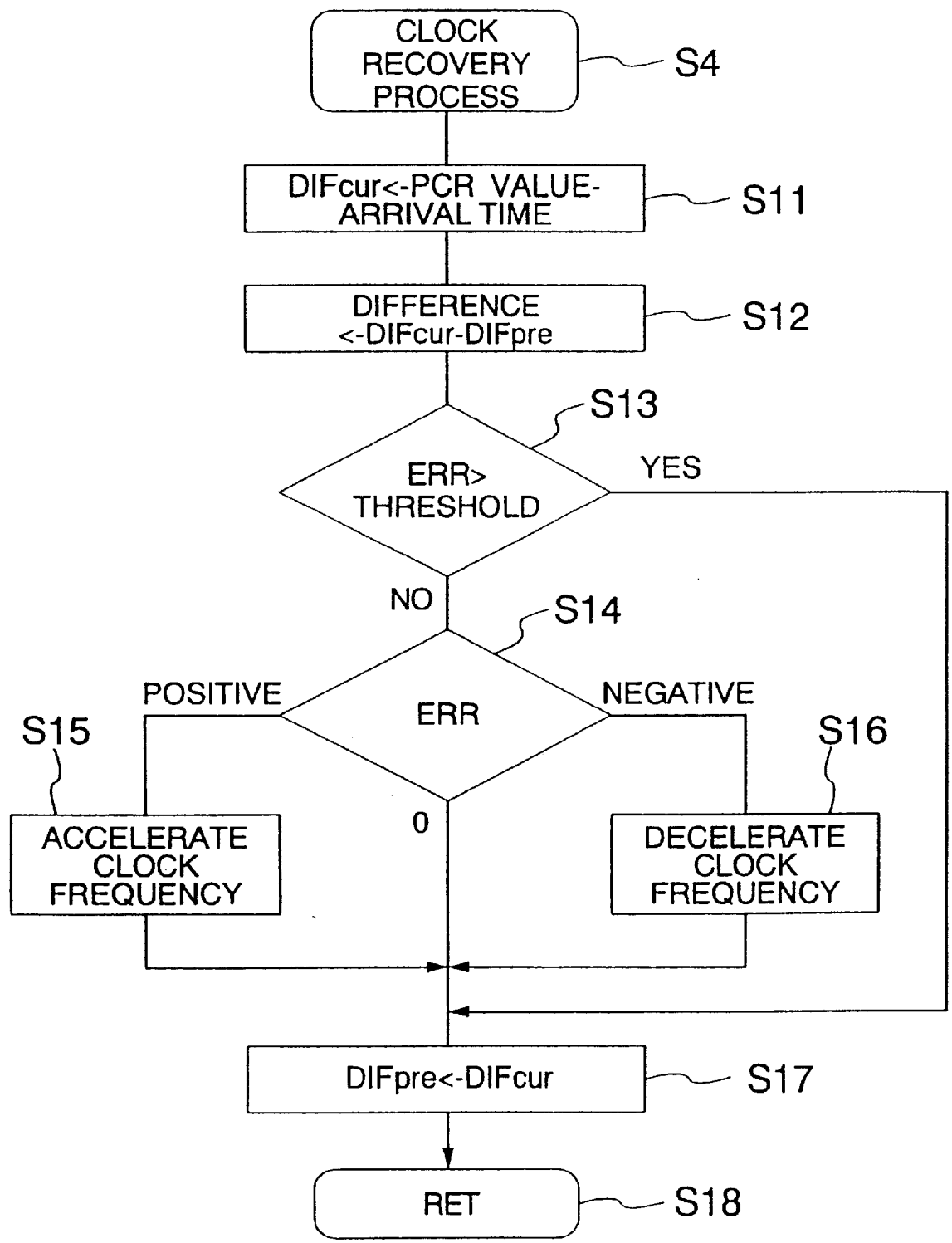
FIG. 9 is a flow chart illustrating the algorithm of a clock recovery process.
Figure 10:
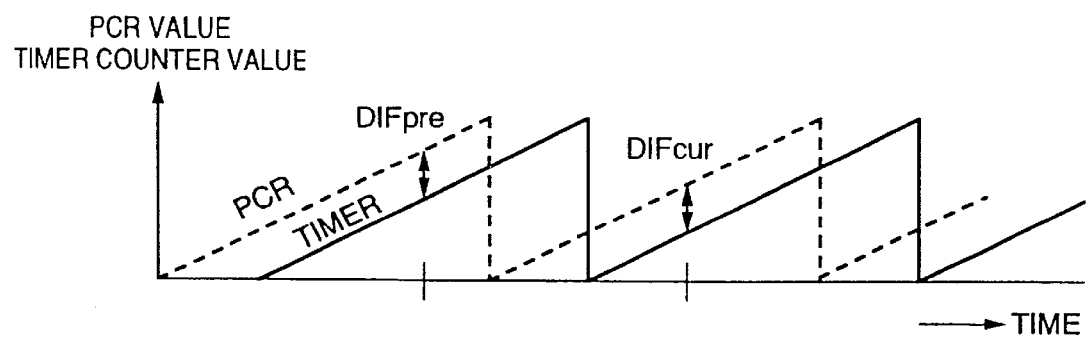
FIG. 10 is a diagram illustrating frequency tracking through comparison between difference values.

The clock recovery process (S4) will be described with reference to FIGS. 9 and 10. The clock recovery process (S4) is performed if PCR is contained in the read packet. The microprocessor 12 reads a PCR value and calculates a difference from the arrival time data added to the packet. This calculated difference is a current difference DIFcur (S11). A difference between the previous DIFpre and the current difference DIFcur is ERR (S12). FIG. 10 illustrates a count (solid line) of the timer 123 in the microprocessor 12 and a count (broken line) PCR at the transmission side. If the frequencies of counting up the counters are the same, the slopes of the count lines are the same and the difference values DIFpre and DIFcur are the same regardless of the packet landing time. Therefore, ERR can be used as an index of a frequency shift. If ERR is larger than a threshold value (S13), a reset operation including an initial value setting is performed and the frequency is not adjusted. If ERR is not larger than a threshold value, it is checked whether the frequency shift ERR is positive or negative (S14). If positive, the clock frequency is accelerated to cancel out the increase of the difference (S15). If negative, the clock frequency is decelerated (S16). If ERR is zero, the frequency is not changed but DIFpre is updated (S17) and the flow returns to the main process (S18). The microprocessor 12 supplies a frequency acceleration/deceleration control signal to the clock generator 4. Generated clocks count up the timer 123. In this manner, a feedback loop is formed.

As described above, in this embodiment, the packet landing buffer 71 is provided in PAM used by the microprocessor for the system control. Therefore, data can be supplied to the decoders without increasing the number of components and the cost thereof.

The secondary advantage is that synchronization control can be performed by software because RAM has the delay buffer 74 as shown in FIG. 1 for the compensation for asynchronization between video and audio to be caused by delays inherent to the decoders and system. Since the write address of the packet landing buffer 71 is updated at the timing of the packet header, a data write mechanism is possible which maintains the operation even after a data error occurs. Since the packet landing or arrival time is written in the packet landing buffer 71, a reference clock can be recovered by software.

Figure 11:
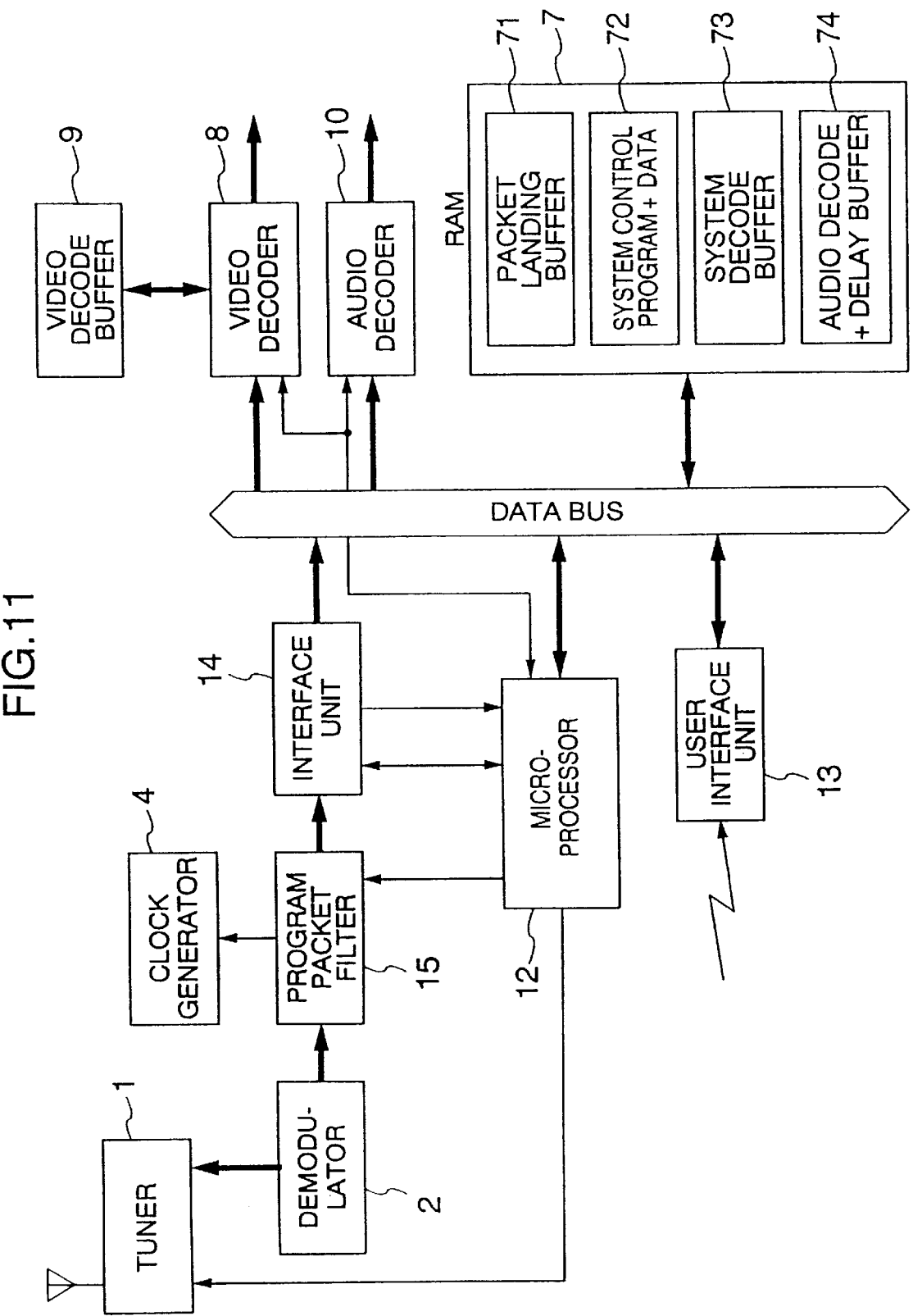
FIG. 11 is a block diagram of a second embodiment of the invention.
Figure 12A:
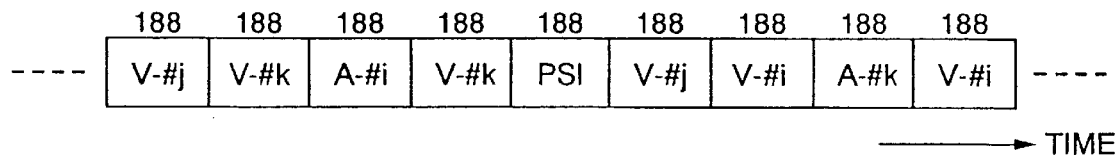
FIGS. 12A and 12B are diagrams used for illustrating discrimination between packets of programs.
Figure 12B:
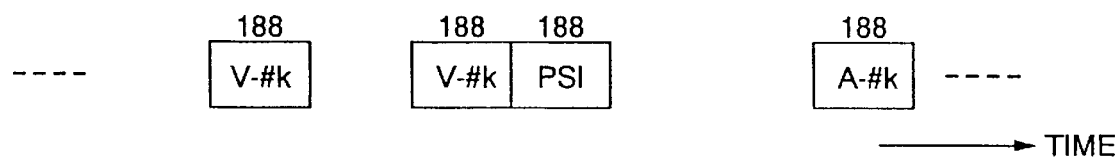
Figure 13:
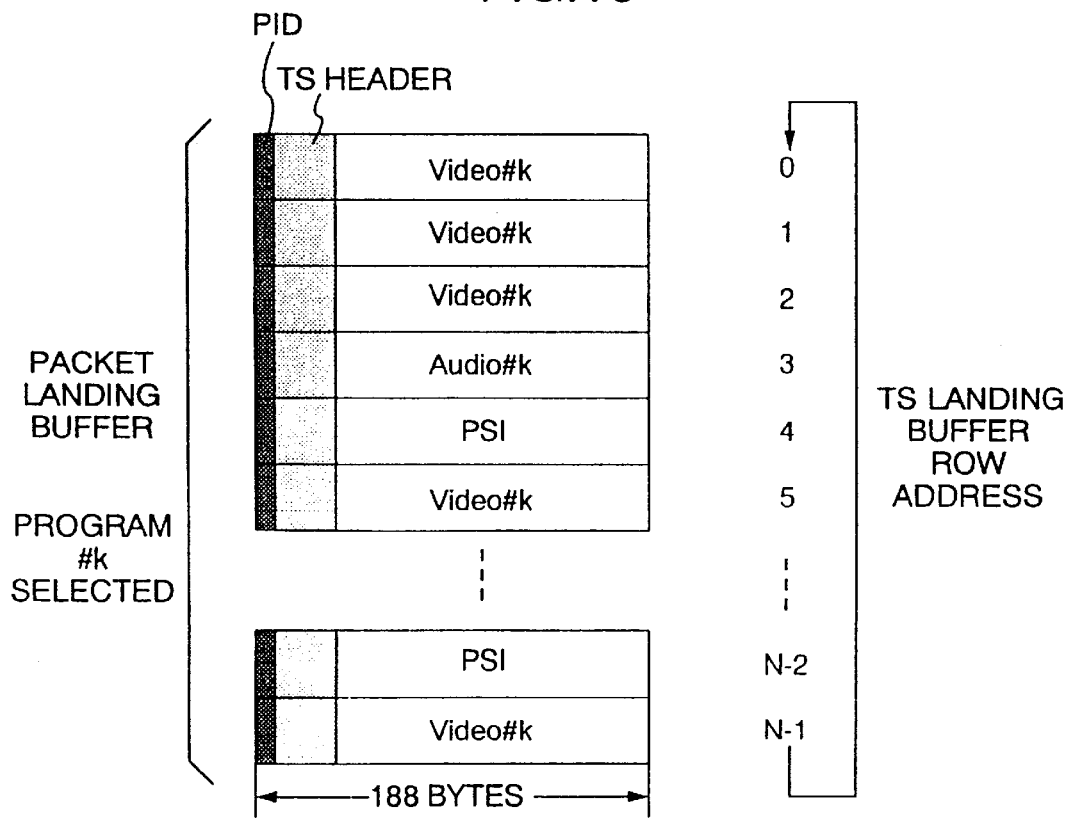
FIG. 13 is a diagram illustrating the structure of a packet landing buffer.

Next, the second embodiment of the invention will be described. FIG. 11 is a block diagram showing the second embodiment. Blocks common to the first embodiment are represented by identical reference numerals, and the description thereof is omitted. In the second embodiment, an output of the demodulator 2 is supplied to a program packet filter 15. The program packet filter 15 derives from transmitted TS packets a PSI packet and a TS packet containing an element of the user selected program (program number #k), and supplies the filtered packets to the interface unit 14. FIGS. 12A and 12B illustrate a filtering process to be executed by the program packet filter 15. FIG. 12A shows inputted TS packets, and FIG. 12B shows outputs after the filtering process. TS packets transferred from the interface unit 14 to RAM 7 are only the PSI packet and TS packets relevant to the program #k. The contents of the packet landing buffer 71 are shown in FIG. 13. Similar to the first embodiment, the packet landing buffer 71 is of a FIFO type cycling by N lines. However, N is set so as to satisfy:

188 bytes×$N$>512 bytes×(element number per program+1)

Figure 14:
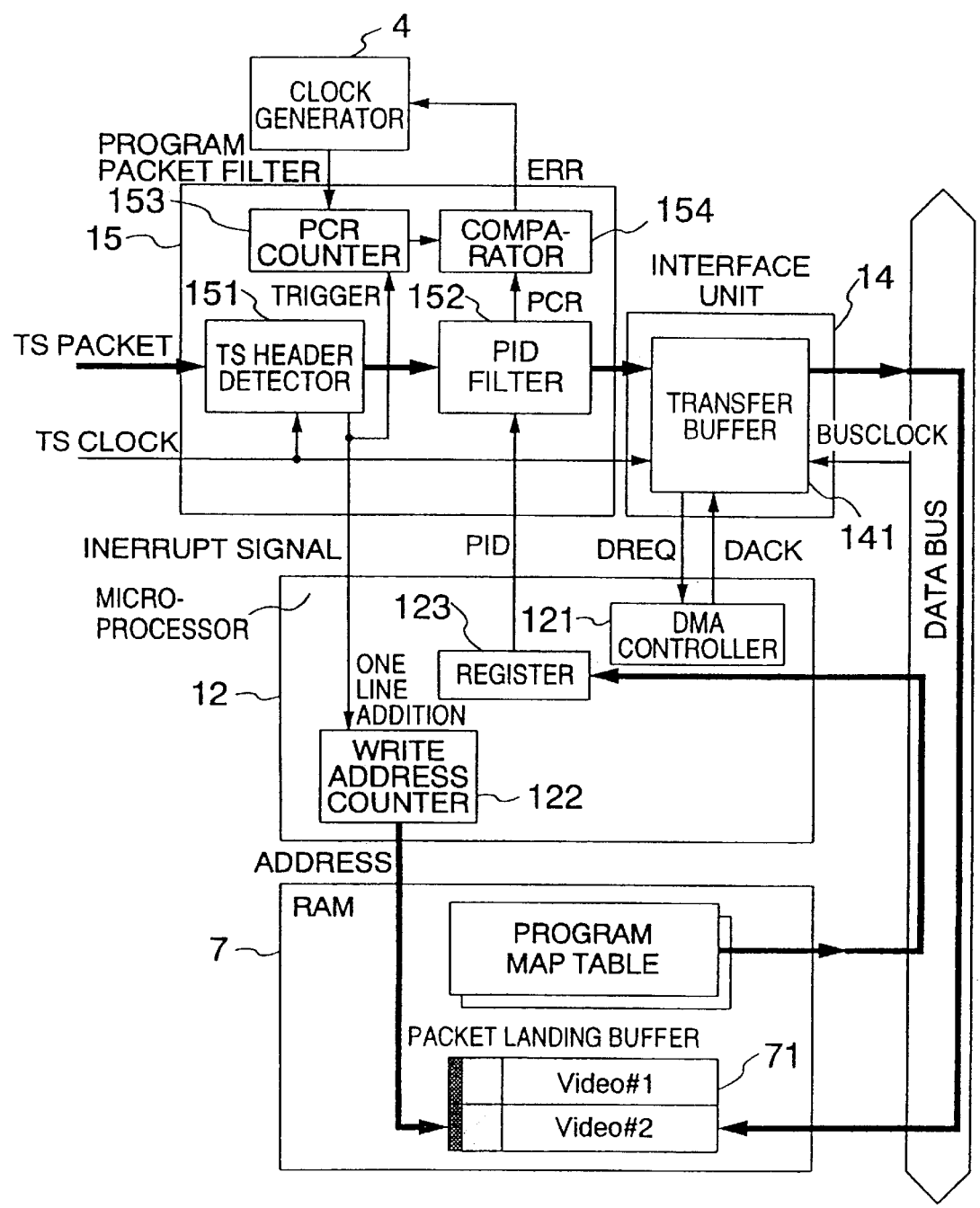
FIG. 14 is a diagram illustrating signal transfer among an interface unit, a microprocessor, and a RAM.
Figure 15:
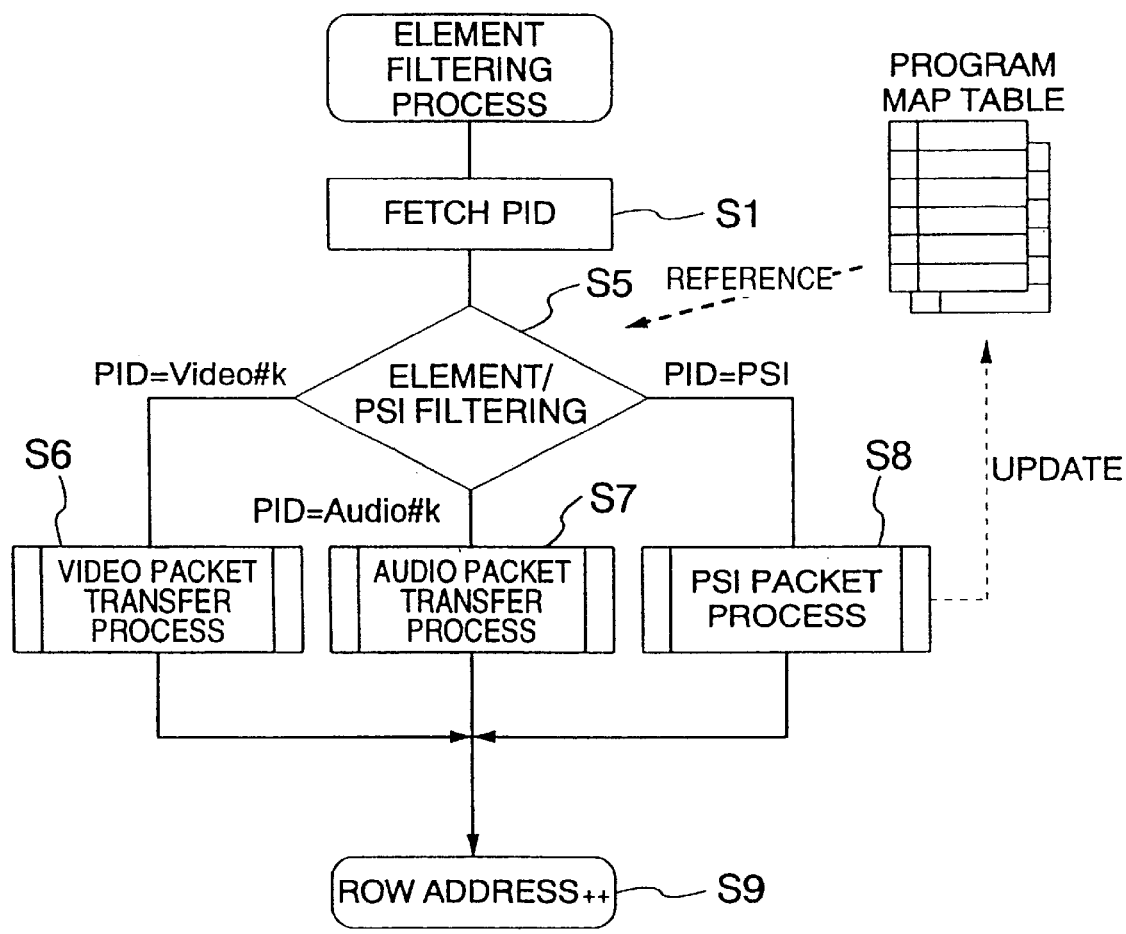
FIG. 15 is a flow chart illustrating the algorithm of an element demultiplexing process.

The capacity of the packet landing buffer 71 is therefore smaller than the first embodiment which receives TS packets including unnecessary packets. In the second embodiment, the recovery process is performed by hardware by connecting the clock generator to the program packet filter 15 so that the information byte representative of the packet arrival time is not additionally stored in the packet landing buffer 71. The details of the recovery process are illustrated in FIG. 14. The program packet filter 15 has a TS header detector 151 for detecting the header of a TS packet, a PID filter 152, a PCR counter 153, and a comparator 154. The arrival timing signal of a TS packet outputted from the TS header detector 151 counts up the write address counter 122 in the microprocessor 12 and is used as a trigger pulse for sampling the count of the PCR counter 153. The sampled count is supplied to one input terminal of the comparator 54. By using the PID data supplied from the microprocessor 12, the PID filter 152 supplies the packets of the program #k and the PSI packet to the transfer buffer 141 of the interface unit 14, and picks up the PCR value from the packet with PCR_PID to supply it to the other input of the comparator 154. The comparator 154 compares the sampled count with the PCR value, and supplies a frequency control signal to the clock generator 4, the control signal accelerating the frequency if the count value is smaller than the PCR value and decelerating if the count value is larger than the PCR value. Clocks outputted from the clock generator 4 count up the PCR counter 153 to thereby form a feedback loop. The data transfer from the transfer buffer 141 to RAM 7 is controlled through handshake with a DMA controller 121. Specifically, after the data transfer preparation is completed at the transfer buffer 141, a transfer request signal DREQ is outputted and when a transfer acknowledge signal DACK is sent back from the DMA controller 121, the data is written in RAM 7 without passing through the register of the microprocessor 12. The write row address used is the address counted up by the above-described mechanism. The microprocessor 12 reads the PID data corresponding to the user selected program #k from the program map table in RAM 12 and sets it to the register 123. The PID data is then supplied from the output port to the PID filter 152. This PID data may be supplied via the data bus. In this embodiment, the program packet filter 15 filters the packets of the program #k and performs the clock recovery process. Therefore, as illustrated in FIG. 15, the algorithm of the data filtering from RAM 7 to the decoders includes only a filtering process for the elements of the program and PSI packet. The processes of S5 to S9 after the packet PID is fetched are the same as FIG. 7, and so the description thereof is omitted. Also in the second embodiment, the packet landing buffer is provided in RAM used by the microprocessor for the system control. Therefore, data can be supplied to the decoders without increasing the number of components and the cost thereof.

The secondary advantage is that synchronization control can be performed by software because RAM has the delay buffer 74 as shown in FIG. 1 for the compensation for asynchronization between video and audio to be caused by delays inherent to the decoders and system. Since the write address of the packet landing buffer is updated at the timing of: the packet header, a data write mechanism is possible which maintains the operation even after a data error occurs.

Next, the third embodiment of the invention will be described. Elements transmitted via a transmission medium may include application programs and data which the microprocessor can process. An apparatus of this embodiment allows a user to use such elements transmitted in the packet format similar to video and audio data described with the first and second embodiments.

Figure 16:
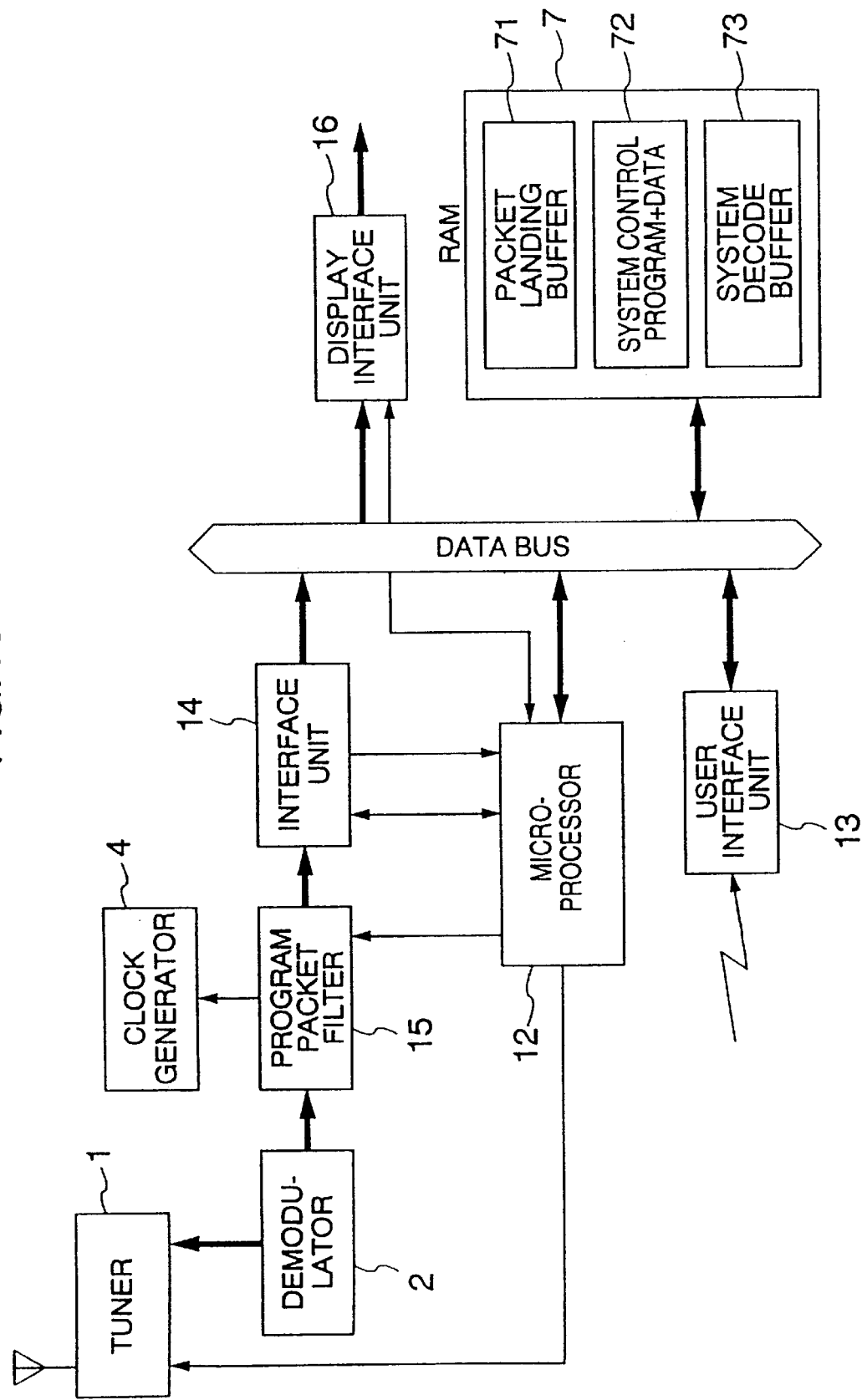
FIG. 16 is a block diagram of a third embodiment of the invention.

FIG. 16 is a block diagram of the third embodiment. This embodiment is based upon the second embodiment, and blocks common to the second embodiment are represented by using identical reference numerals and the description thereof is omitted. The program packet filter 15 filters multiplexed TS packets containing a user selected program and the PSI packet, and the filtered packets are sequentially stored in the packet landing buffer 71 in RAM 7. The microprocessor 12 analyzes the contents of elements in accordance with the information of the PSI packet and can know that the elements contain an application program and data executable by the microprocessor 12. The microprocessor 12 then reads the application program and data from the payload of each packet, and relocates them in RAM 7 so as to make them executable by the microprocessor 12. The system control program executes packet, reception tasks similar to the above embodiments, and time divisionally assigns each task with resources of the microprocessor 12 such as a CPU cycle and a data bus access privilege, for execution of the relocated application program. The application program therefore runs in each assigned time slot. Assuming that the application program displays received graphics and/or audio data, the data is supplied to an external monitor and/or speaker via a display interface unit 16 connected to the data bus. The user interface unit 13 is constituted by a keyboard, a mouse, and other devices like a general computer. The user interface unit 13 functions as a means for feeding back an instruction to the microprocessor 12 from a user in response to the outputs from the external monitor and/or speaker.

As described above, also in receiving a program constituted by elements of an application program and data, the cost of the apparatus can be reduced by providing the packet landing buffer 71 in RAM 7, as compared to the MPEG system specifications which stipulate provision of transport buffers of 512 bytes regardless of the contents of elements.

As described in detail, the packet landing buffer is provided in RAM used by the microprocessor for the system control. Therefore, data can be supplied to the decoders without increasing the number of components and the cost thereof.

Figure 17:
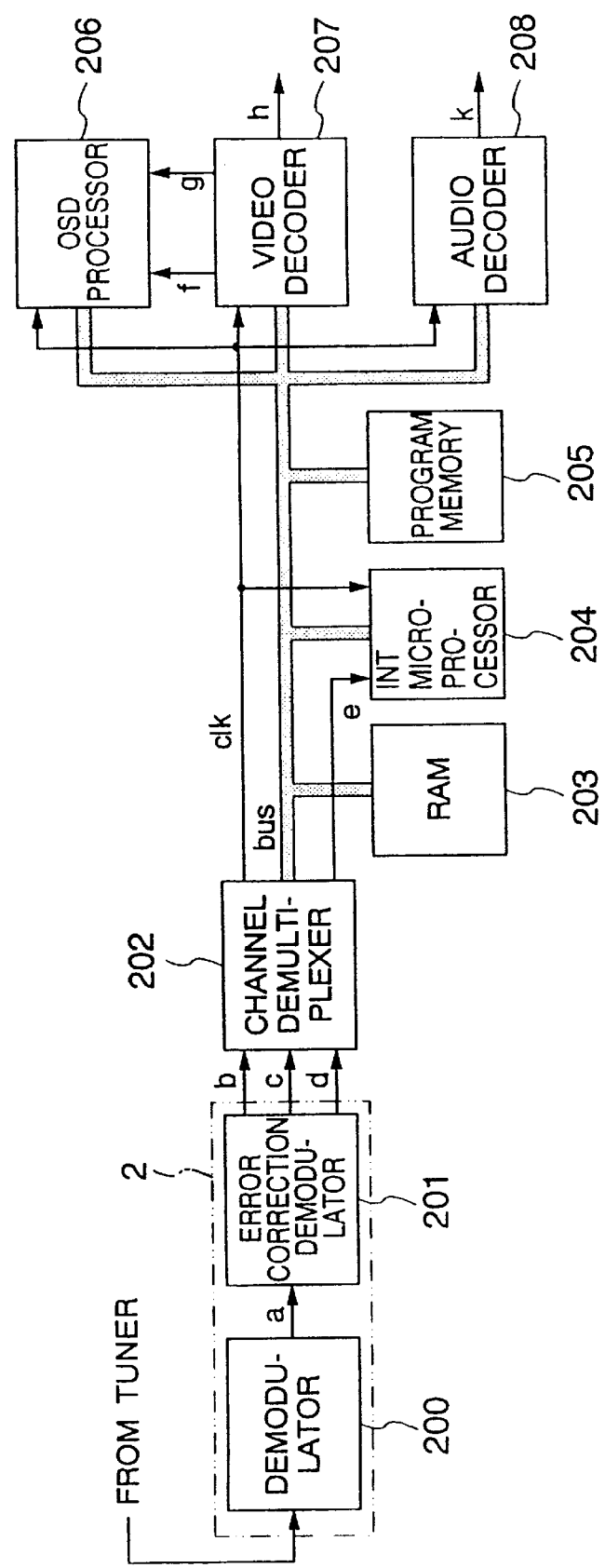
FIG. 17 is a block diagram a reception apparatus for compressed video and audio data according to a fourth embodiment of the invention.

FIG. 17 is a block diagram showing the structure of a reception apparatus for compressed video and audio data.

In FIG. 17, reference numeral 200 represents a demodulator, reference numeral 201 represents an error correction demodulator, reference numeral 202 represents a channel demultiplexer, reference numeral 203 represents a random access memory (hereinafter called RAM), reference numeral 204 represents a microcomputer, reference numeral 205 represents a program memory, reference numeral 206 represents an on-screen display processor (hereinafter called an OSD processor), reference numeral 207 represents a video decoder, and reference numeral 208 represents an audio decoder. In FIG. 17, a tuner and other blocks of the reception apparatus for compressed video and audio data are not shown because they are the same as FIGS. 1 and 11.

Figure 18:
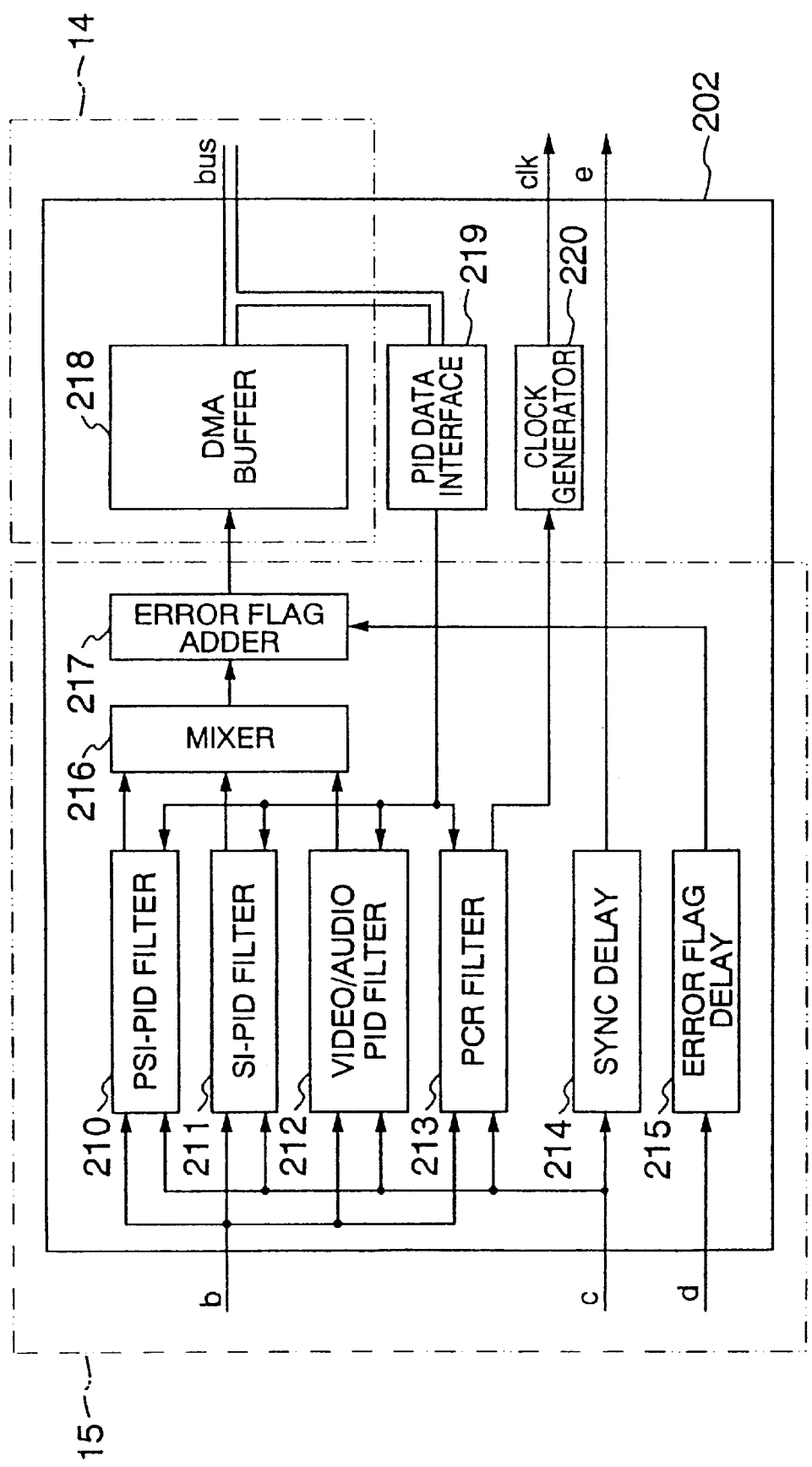
FIG. 18 is a block diagram showing a first example of the structure of a channel demultiplexer.

FIG. 18 is a block diagram showing an example of the structure of the channel demultiplexer 202. In FIG. 18, reference numeral 210 represents a PSI-PID filter, reference numeral 211 represents an SI-PID filter, reference numeral 212 represents a video/audio PID filter, reference numeral 213 represents a PCR filter, reference numeral 214 represents a sync signal delay circuit, reference numeral 215 represents an error flag delay circuit, reference numeral 216 represents a mixer, reference numeral 217 represents an error flag adder, reference numeral 218 represents a buffer for direct memory access (hereinafter called a DMA buffer), reference numeral 219 represents a PID data interface unit, and reference numeral 220 represents a clock generator.

Figure 19:
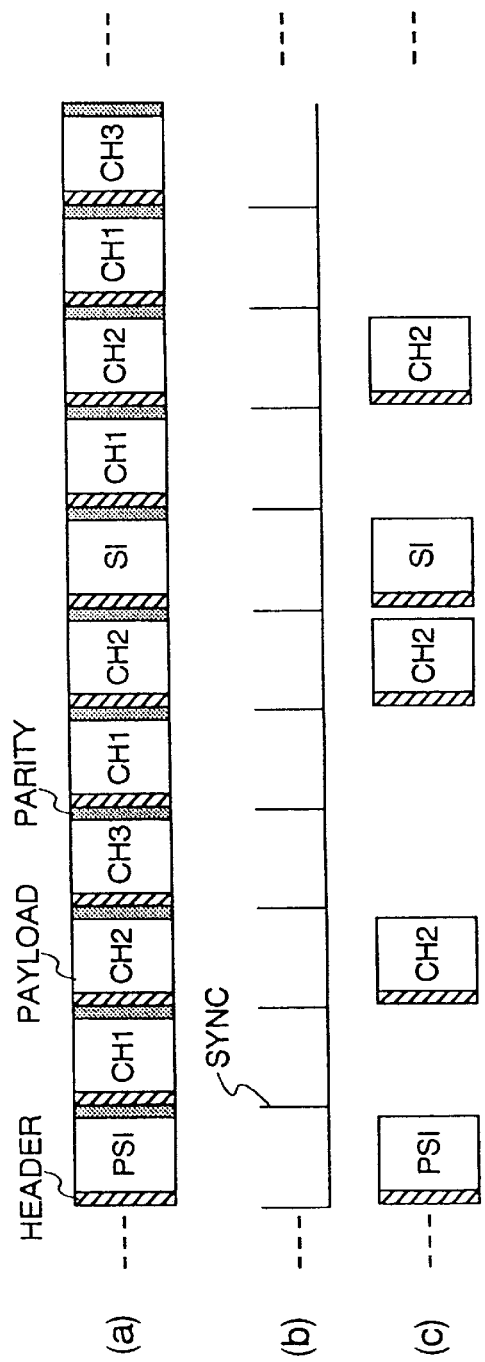
FIG. 19 is a first drawing illustrating the operation of the reception apparatus for compressed video and audio data.
Figure 20:
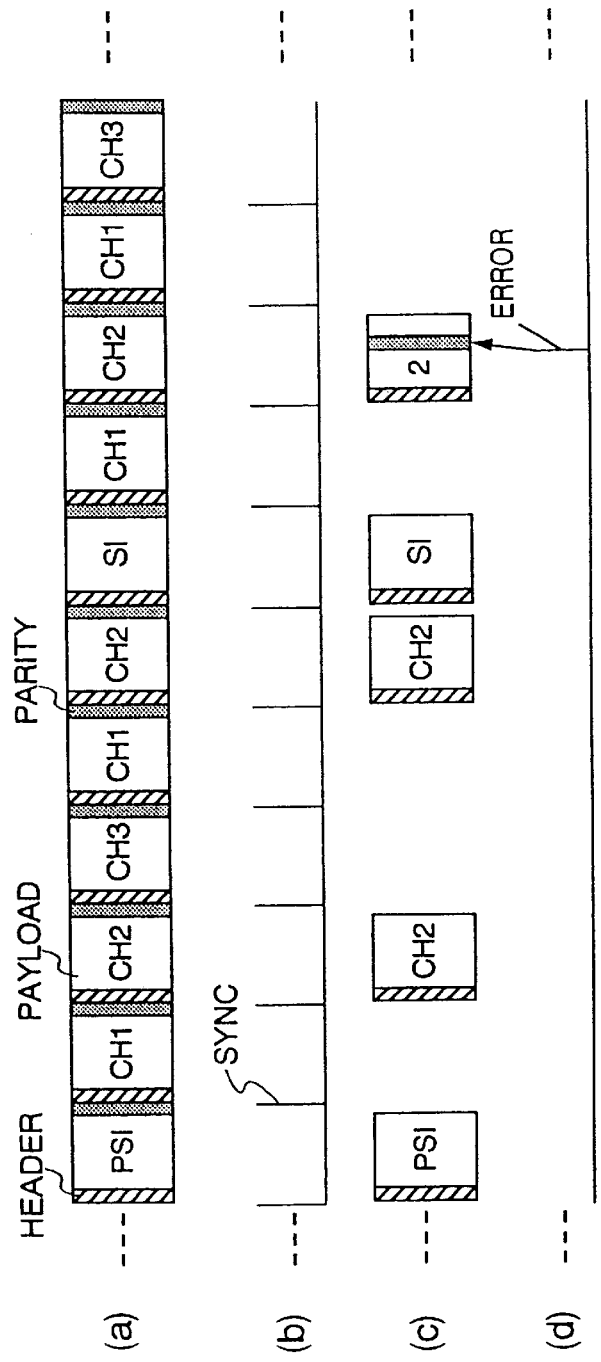
FIG. 20 is a second drawing illustrating the operation of the reception apparatus for compressed video and audio data.
Figure 21:
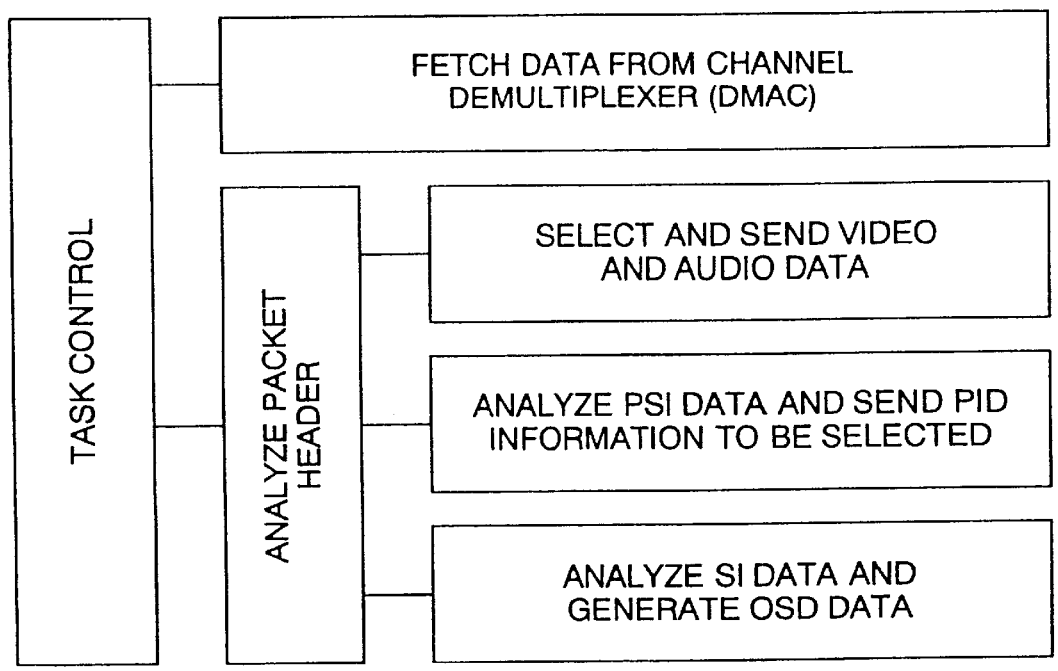
FIG. 21 is a diagram showing tasks of a microcomputer.

FIGS. 19 and 20 are diagrams used for explaining the operation of the embodiment shown in FIGS. 17 and 18. FIG. 21 is a diagram showing tasks executed by the microprocessor.

The structure of the reception apparatus shown in FIG. 17 is based upon the apparatus shown in FIG. 11. The relationship therebetween will be briefly described. The circuit constituted by the demodulator 200 and error correction demodulator 201 shown in FIG. 17 corresponds to the demodulator 2 shown in FIG. 11. The channel demultiplexer 202 shown in FIG. 17 corresponds to the circuit constituted by the program packet filter 15 and interface unit 14 shown in FIG. 11. The circuit constituted by RAM 203 and program memory 205 shown in FIG. 17 corresponds to RAM 7 shown in FIG. 11. The video decoder 207 and audio decoder 208 shown in FIG. 17 correspond to the video decoder 8 and audio decoder 10 shown in FIG. 11, respectively. The circuit shown in FIG. 18 corresponds to the circuit portion constituted by the program packet filter 15, interface unit 14, and clock generator 4 shown in FIG. 11.

Referring to FIG. 17, an encoded stream (group of packets) a inputted to the error correction demodulator 201 is a set of multiplexed data: including TS packets corresponding encoded data of respective channels CH1, CH2, and CH3 shown in FIGS. 19 and 20; a TS packet of PSI (program specific information); and an IS packet of SI (value added service information). Each TS packet is added with parity data for transmission error correction and detection. The error correction decoder 201 corrects error by using the parity data, and sends an error-corrected encoded stream (b in FIG. 17), a sync signal c ((b) in FIGS. 19 and 20) corresponding to the header of the TS packet, and an error flag d ((d) in FIG. 20) if transmission errors remain without being corrected by the parity data, to the channel demultiplexer 202.

In the channel demultiplexer 202 shown in FIG. 18, the error-corrected encoded data b is supplied to the PSI-PID filter 210, SI-PID filter 211, video/audio PID filter 212, and PCR filter 213. The PSI-PID filter 210 filters or selects a TS packet (hereinafter called a PSI packet) of multiplexed information such as PAT and PMT. The Si-PID filter 211 filters a TS packet (hereinafter called SI packet) of value added service information such as a program guide and conditional access information. The video/audio PID filter 212 filters a TS packet (hereinafter called either a video packet or an audio packet) corresponding to video or audio encoded data of a particular channel. The PCR filer 213 captures a TS packet having PCR data and picks up the PCR data. The PSI, SI, video, and audio packets are re-multiplexed by the mixer 216 and sent to the error flag adder 217 as a post-channel-selection encoded stream. The post-channel-selection encoded stream is shown at (c) in FIGS. 19 and 20. The encoded stream in the example shown in FIGS. 19 and 20 is assumed that the channel CH2 is selected. As shown, the encoded stream is constituted only by the PSI packet, Si packet, and TS packets of CH2 (not distinguished between video and audio in FIGS. 19 and 20).

The error flag adder 217 is inputted with the post-channel-selection encoded stream and the error flag d underwent proper timing adjustment by the error flag delay circuit 215, an error mark signal being added to the encoded stream as shown at (c) in FIG. 20. This mark signal is preferably a signal indicating a unique pattern in the encoded stream, such as a sequence-error-code in the MPEG method. Thereafter, the encoded stream is DMA transferred via the DMA buffer 218 and the data bus to the microprocessor 204 and stored in RAM 203.

The sequence-error-code of the MPEG method is a 4-byte code. If an error flag code made of a plurality of bytes, in this example, four bytes, is used and if the position of the error flag is between the last byte and the third last byte of the TS packet, then the error flag adder 217 adds the error flag code at the fourth last byte of the TS code in order not to ride upon the two consecutive packets.

The PID interface unit 219 is connected to the bus. The PID interface unit 219 receives the PID information from the microcomputer 204 and supplies the PSI-PID filter 210, SI-PID filter 211, video/audio PID filter 212, and PCR filter 213 with the PID information of the TS packet to be captured.

As shown in FIG. 21, in addition to the DMA transfer, the microprocessor 204 reads the encoded stream from RAM 203, and analyzes the header of the TS packet to discriminate data types of respective TS packets, i.e., between video data, audio data, PSI data, and SI data. Thereafter, the microprocessor 204 processes the data in accordance with its type.

In the case of video data, the video data is supplied to the video decoder 207 via the bus to decode it. Similarly, the audio data is supplied to the audio decoder 208 to decode it.

In the case of PSI data, in accordance with the analyzed contents of the PSI data and the user selected channel information entered from an unrepresented remote controller, the PID information of each packet to be captured is supplied via the bus and PID interface 219 to the PSI-PID filter 210, SI-PID filter 211, video/audio PID filter 212, and PCR filter 213 respectively of the channel demultiplexer 202.

In the case of SI data, the contents thereof are analyzed. If the data is program guide information, OSD data is generated from this information and sent to the OSD processor 206 via the bus. The OSD processor 206 processes the OSD data f and sends it to the video decoder 207 in synchronization with a sync q of the video data decoded by the video decoder 207. In this manner, the program guide is displayed, for example, overlaid on the decoded video data.

The program memory 205 stores programs writing the operations of the microprocessor 204. Although the program memory 205 may be a read-only memory (ROM), other memories such as a rewritable non-volatile memory and an IC card may be used which can deal with a variety type of SI information.

In addition to the bus, a clock signal clk and a TS packet sync signal e are supplied from the channel demultiplexer 202 to the microprocessor 204. By using information captured by the PCR filter 213, the clock generator 220 generates a reference clock synchronous with video or audio data or both data. This clock is set to 27 MHz according to the MPEG method. The clock signal is used in common as the clock signals for the microprocessor 204, video decoder 207, and audio decoder 208.

After the timing of the sync signal is adjusted by the sync delay circuit 214 so as to synchronize it with the TS packet sent over the bus, the sync signal is supplied via the port e to the microprocessor 204 as its interrupt signal. In response to the interrupt signal, data of one packet is supplied to the microprocessor 204.

In this embodiment, therefore, it is possible to discriminate between the video and audio data of the received bit stream with a number of multiplexed channels and supplies data to the proper decoder. Since the same microprocessor 204 is used for processing additional information such as SI, this processing can be flexibly performed by exchanging programs or the like.

Since the common clock signal is used for the microprocessor 204, video decoder 207, and audio decoder 208, transfer of encoded data can be efficiently carried out. Since the sync signal of the TS packet is used as the interrupt signal of the microprocessor 204 and the sync detection of the TS packet is performed only once by the error correction circuit 201, the structure of the apparatus can be simplified.

Figure 22:
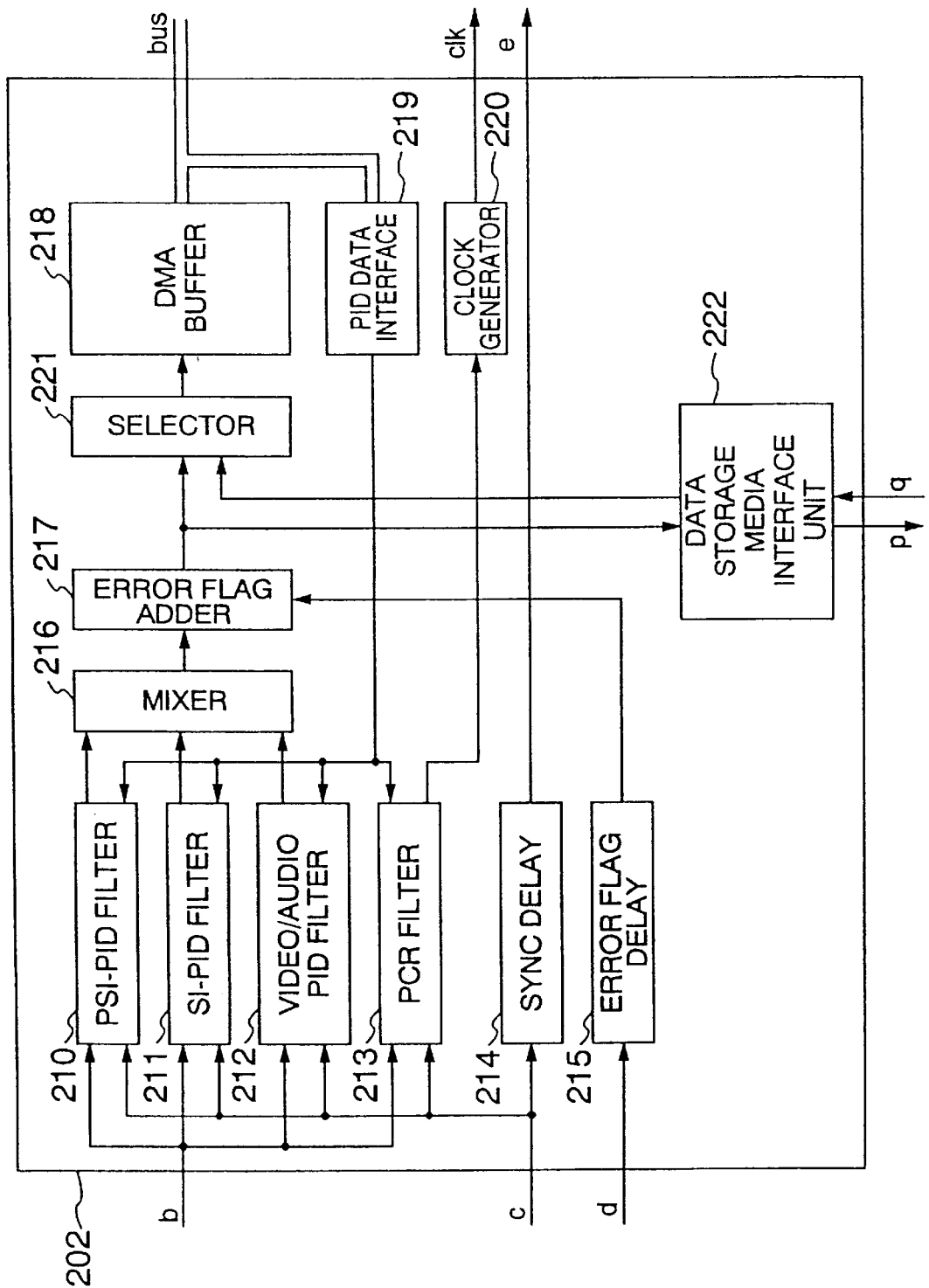
FIG. 22 is a block diagram showing a second example of the structure of a channel demultiplexer.

FIG. 22 shows a second example of the structure of the channel demultiplexer 202. In FIG. 22, similar blocks to those of the first example shown in FIG. 18 are represented by using identical reference numerals. In this second example, a selector 221 and a data storage media interface unit 222 are added to the structure of the first example.

Post-channel-selection encoded data subjected to the error flag process by the error flag adder 217 is supplied to the selector 221 and data storage media interface unit 222. The data storage media interface unit 222 supplies the post-channel-selection encoded data to data storage media such as a video taperecorder (VTR) and a hard disk, as a record signal p. A data storage media reproduction signal q is inputted to the data storage media interface 222 and supplied to the selector 221.

In response to a control signal (not shown), the selector 221 selects either decoding the directly received encoded data or decoding the reproduction signal from the data storage media, and sends the selected encoded data to the DXA buffer 218.

In this example, video/audio data can be digitally recorded and reproduced without; providing an encoder/decoder in the data storage media apparatus. The signal after channel selection is used as a record signal to the data storage media, and the data rate can be suppressed minimum.

Figure 23:
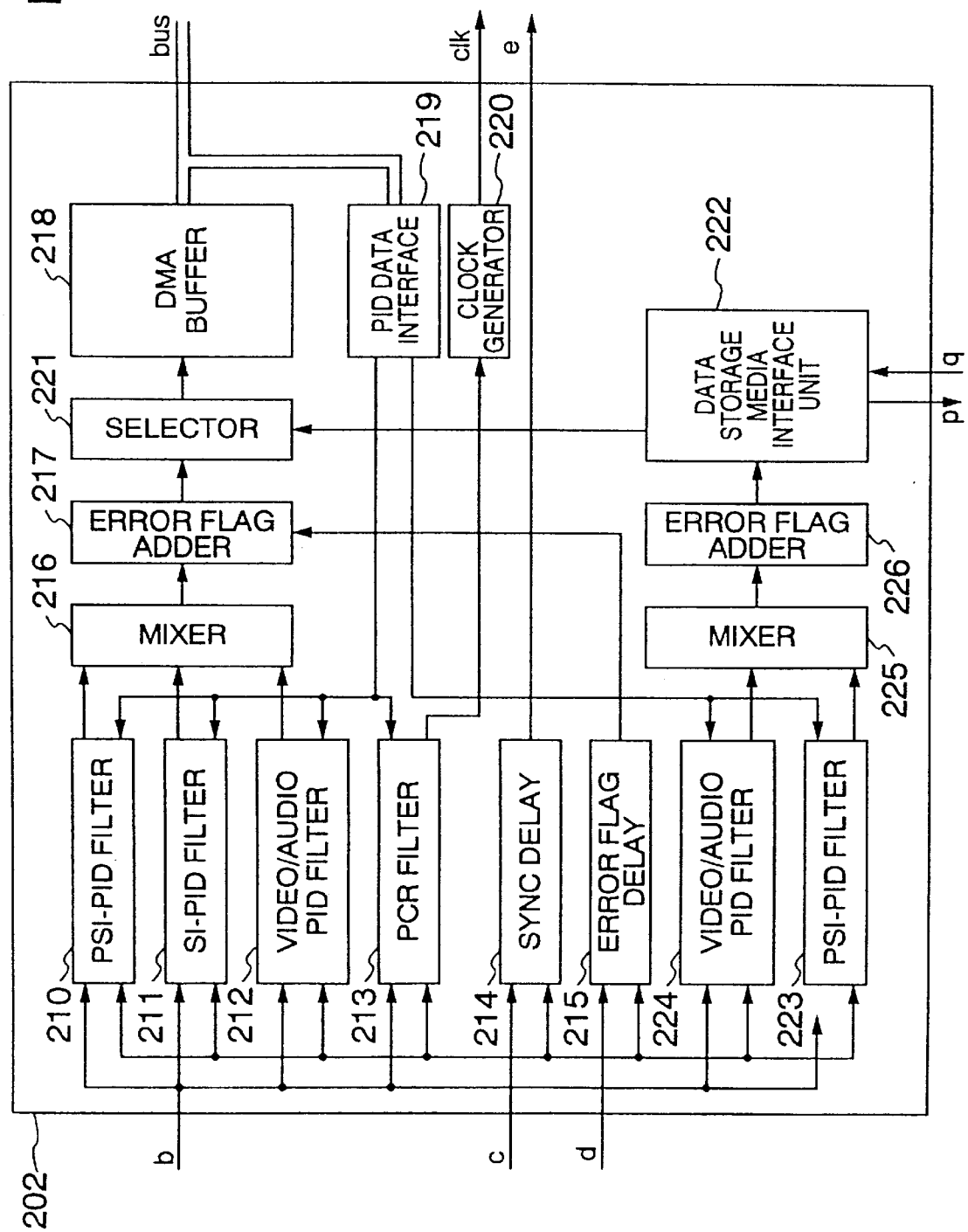
FIG. 23 is a block diagram showing a third example of the structure of a channel demultiplexer.
Figure 24:
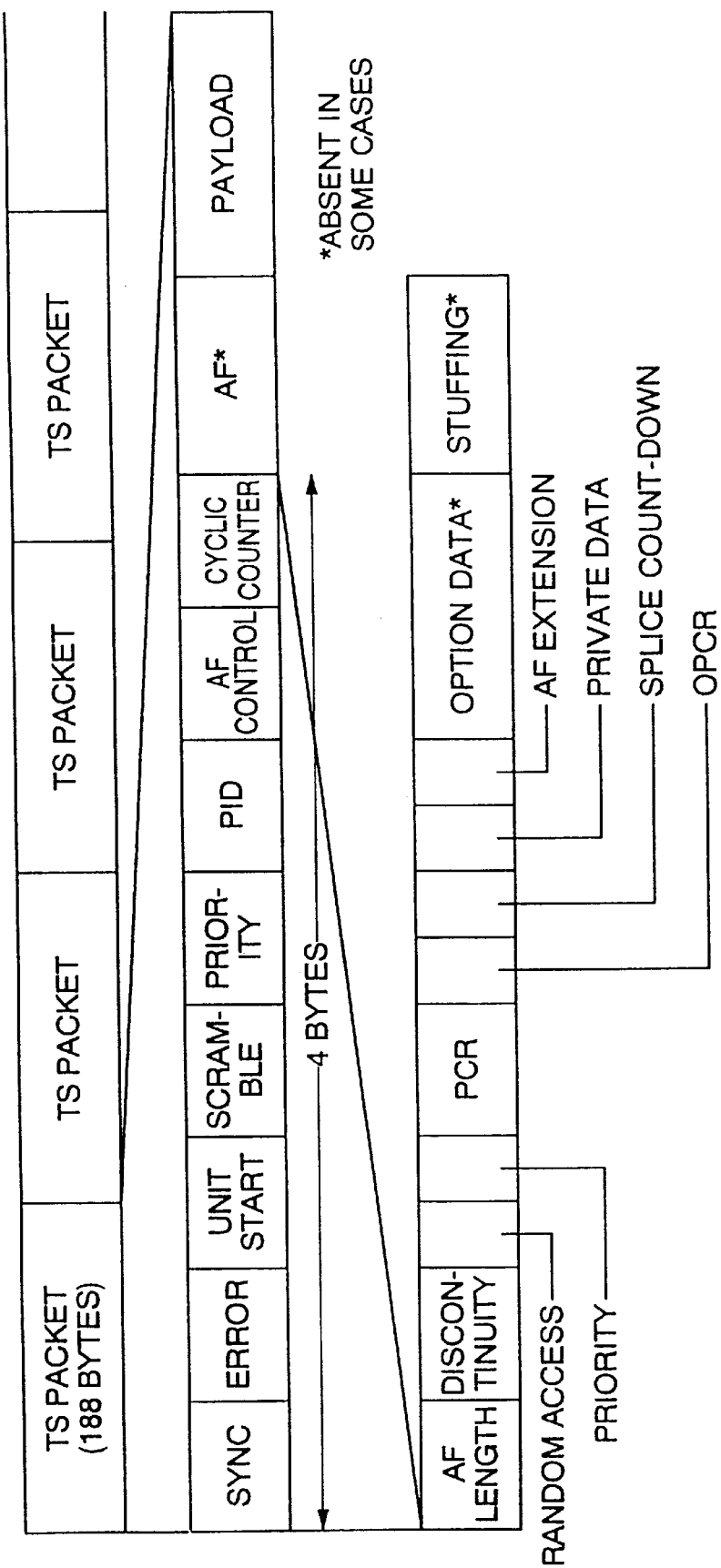
FIG. 24 is a diagram illustrating an encoded stream.
Figure 25:
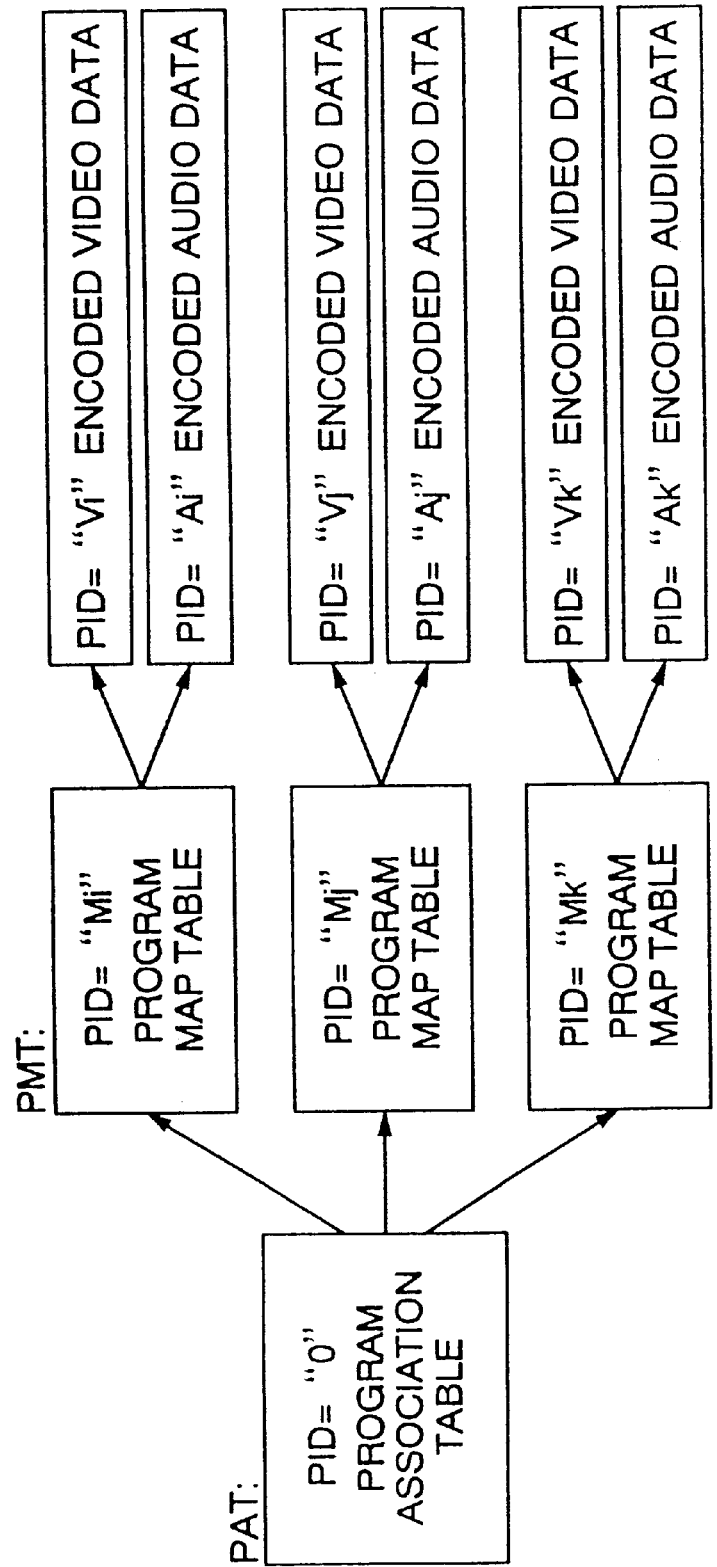
FIG. 25 is a diagram illustrating a principle of selecting a channel.

FIG. 23 shows a third example of the structure of the channel demultiplexer 202. In FIG. 23, similar blocks to those of the second example are represented by using identical-reference numerals. In this third example, a PSI-PID filter 223, a video/audio filter 224, a mixer 225, and an error flag adder 226 are duplicated and added to the second example.

A record signal to the data storage media is formed by the duplicated PSI-PID filter 223, video/audio filter 224, mixer 225, and error flag adder 226.

In this embodiment, therefore, a channel for recording data in data storage media can be set

What is claimed is:

1. A decoder configured to receive a group of multiplexed packets, said multiplexed packets containing video data and associated audio data compressed by compression codes, wherein said multiplexed packets contain a packet header with attribute information and are arbitrarily multiplexed in packet by packet manner and said video data and associated audio data includes at least one set of video and audio signals, and to output a set of video and audio signals, said decoder comprising:

a processor configured or adapted to execute a process in accordance with a stored program;

a random access memory which is accessible by direct accessing by said processor via a single data bus, wherein said group of multiplexed packets are stored in said random access memory and at least one of said video data and associated audio data is read from said random access memory to be analyzed in accordance with said attribute information, at least in part, by said processor, wherein said group of multiplexed packets are stored in said random access memory in the order in which they were received, and are readout and analyzed by said processor in the order in which they were received; and a filter configured to filter said group of multiplexed packets in accordance with attributes thereof, wherein filtered packets output by said filter are stored in said random access memory so that said group of filtered packets are analyzed by said processor.

2. A decoder configured to receive a group of multiplexed packets, said multiplexed packets containing video data and associated audio data compressed by compression codes, wherein said multiplexed packets contain a packet header with attribute information and are arbitrarily multiplexed in packet by packet manner and said video data and associated audio data includes at least one set of video and audio signals, and to output a set of video and audio signals, said decoder comprising:

a processor;

a memory which is accessible by direct accessing by said processor via a single data bus, wherein said group of multiplexed packets are stored in said memory and read from said memory to be analyzed in accordance with said attribute information, at least in part, by said processor, wherein said group of multiplexed packets are stored in said random access memory in the order in which they were received, and are readout and analyzed by said processor in the order in which they were received; and a fitter configured to filter said group of multiplexed packets in accordance with attributes thereof, wherein filtered packets output by said filter are stored in said random access memory so that said group of filtered packets are analyzed by said processor.

* * * * *